(12) United States Patent
Toyoda

(10) Patent No.: US 7,907,206 B2
(45) Date of Patent: Mar. 15, 2011

(54) IMAGE PICKUP APPARATUS AND CONTROL METHOD THEREFOR

(75) Inventor: Yasuhiro Toyoda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 11/271,667

(22) Filed: Nov. 10, 2005

(65) Prior Publication Data

US 2006/0098115 A1    May 11, 2006

(30) Foreign Application Priority Data

Nov. 11, 2004   (JP) .................. 2004-328056
Oct. 25, 2005   (JP) .................. 2005-310502

(51) Int. Cl.
*H04N 5/238*    (2006.01)
*G03B 9/40*    (2006.01)

(52) U.S. Cl. ........ 348/367; 348/363; 396/489; 396/487; 396/484

(58) Field of Classification Search .......... 348/367, 348/362; 396/489, 487, 484
See application file for complete search history.

(56) References Cited

U.S. PATENT DOCUMENTS 6,542,194 B1 *  4/2003  Juen ............... 348/367
2005/0063698 A1 * 3/2005  Usuda et al. ........ 396/489

FOREIGN PATENT DOCUMENTS

JP   2001-215555   8/2001
JP   2001-235779 *  8/2001

* cited by examiner

*Primary Examiner* — Jason Chan
*Assistant Examiner* — Joel Fosselman
(74) *Attorney, Agent, or Firm* — Cowan, Liebowitz & Latman, P.C.

(57) ABSTRACT

There is provided an image pickup apparatus having a simple structure that enables reduction of shutter release time lag and shutter control with highly accurate shutter time. The apparatus comprises an image pickup element that converts an optical object image incident thereon into an electric image signal to output it, a shutter apparatus having a screen for shielding an exposure aperture for the image pickup element, a reset circuit for reset scanning the image pickup element on a predetermined unit-batch-by-unit-batch basis sequentially in a running direction of the screen, a plurality of detection circuits disposed at different positions along the running direction of the screen for detecting passing of the screen after start of running of the screen for shielding the exposure aperture and before it runs over the exposure aperture, and a control circuit that estimates a running characteristic of the screen during running based on a detection result by the plurality of detection circuit and controls reset scanning by the reset circuit in conformity with the estimated running characteristic.

17 Claims, 26 Drawing Sheets

L1 - optical axis
101 - main body
102 - detachable lens
103 - optical system
105 - focus screen
106 - pickup element
107 - display
109 - lens
111 - half mirror
112 - pentaprism
113 - focal place shutter
119 - main switch
121 - focus detection apparatus
122 - submirror
123 - mode changing switch
124 - package
156 - low pass filter
180 - display apparatus 1g - shaft
1f - shaft
10 - slit forming blade
10a - slit forming edge
11-13 - cover blades
14 - first arm
15 - second arm
16a - swaying dowel
16b, 17b, 16c, 17c - swaying dowels
16d, 17d - swaying dowels
17a - swaying dowel
40 - cover plate
40a - exposure aperture
53, 54 - reflective plates 1 - boss plate
1a - exposure aperture
1c - long hole
1h - shaft
1j - shaft
10 - low diaphragm
11 - cover blades
12 - cover blades
13 - cover blades
18 - change lever
18a - armature portion
18b - input bin
18d - armature portion
29 - drive member
29a - armature
29b - armature
29c - armature
29d - armature portion
29e - spring hook
30 - roller
31 - power spring
32 - armature
33 - shaft
34 - yoke
35 - coil
51 - photo reflector
52 - photo reflector 1 - substrate
1a - exposure aperture
1c - long hole
1h - shaft
1j - shaft
10a - slit forming edge
18 - charge lever
18a - arm portion
18b - input pin
18d - arm portion
29 - drive member
29a - arm portion
29b - arm portion
29c - drive pin
29e - spring hook
29d - armature portion
30 - roller
31 - power spring
32 - armature
33 - shaft
34 - yoke
35 - coil
51, 52 - photo reflectors 10 - lower diaphragm
10a - slit forming edge
40 - cover plate
51, 52 - photo reflectors
53, 55 - reflector plates
55, 56 - light beams

| FIG. 14A | FIG. 14B |

1 - boss plate
1a, 40a - exposure aperture
1c - long hole
1h - shaft
1j - shaft
10a - slit forming edge
16a - swaying dowel
18 - charge lever
18a - armature portion
18b - input pin
18d - armature
29 - drive member
29a - armature
29b - armature
29c - drive pin
29e - spring hook
29d - armature portion
30 - roller
31 - power spring
32 - armature
33 - shaft
34 - yoke
52, 51 - photo reflector
210e - hole edgee
210f - projecting portion
210h - hole 1 - boss plate
1a - exposure aperture
1c - long hole
1f - shaft
1g - shaft
1h - shaft
1j - shaft
10 - low diaphragm
10a - slit forming edge
11 - cover blade
12 - cover blade
13 - cover blade
14 - cover blade
15 - second arm
16a - swaying dowel
16b - swaying dowel
16c - swaying dowel
16d - swaying dowel
17a - swaying dowel
17b - swaying dowel
17c - swaying dowel
17d - swaying dowel
18 - charge lever
18a - armature portion
18b - input bin
18d - armature portion
29 - drive member
29a - armature
29b - armature
29c - armature
29d - armature portion
29e - spring hook
30 - roller
31 - power spring
32 - armature
33 - shaft
34 - yoke
35 - coil
40 - cover plate
40a - exposure aperture
51 - photo reflectors
52 - photo reflectors
53 - reflector plates
54 - reflector plates
2103 - hole edge
210f - projecting portion
210h - hole
310f - projecting point
310h - hole

FIG. 22

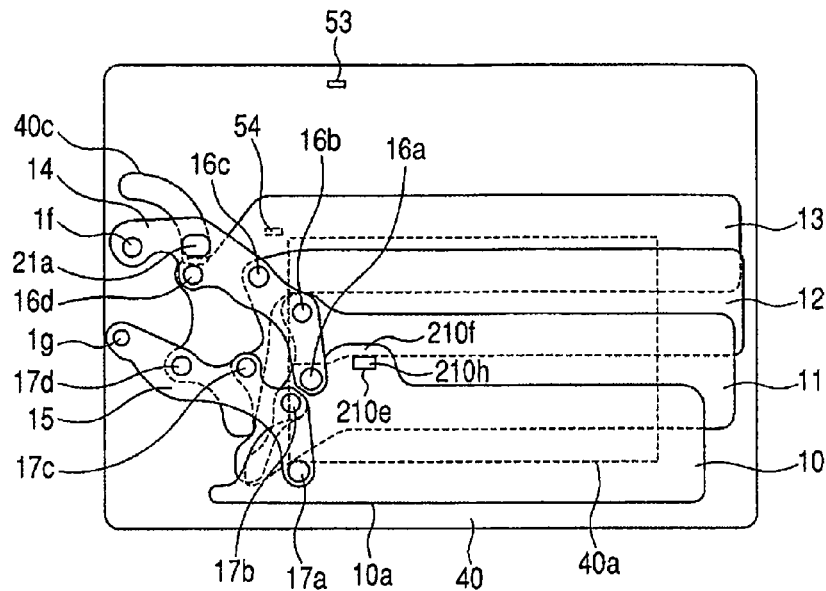

FIG. 23

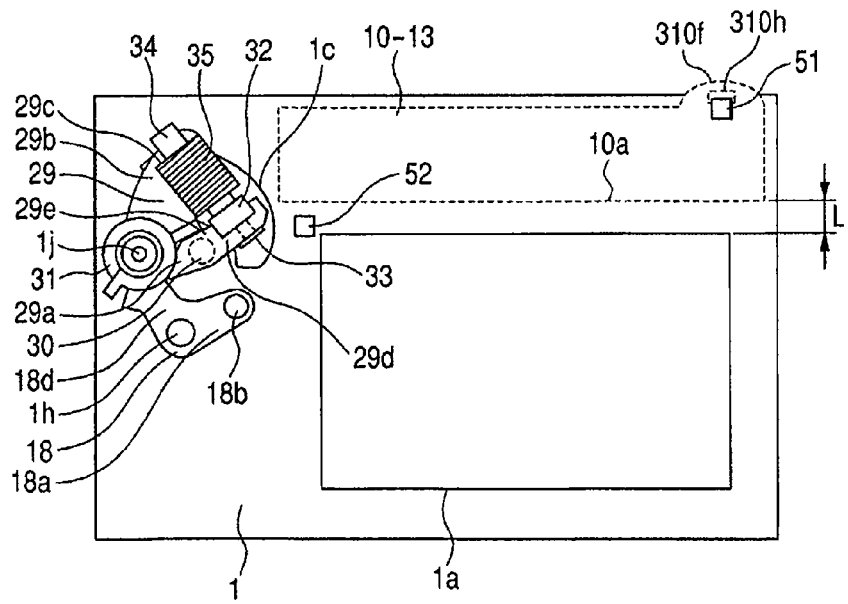

1f - shaft
1g - shaft
10 - low diaphragm
10a - slit forming edge
11 - cover blades
12 - cover blades
13 - cover blades
14 - first arm
15 - second arm
16a - swaying dowel
16b - swaying dowel
16c - swaying dowel
16d - swaying dowel
17a - swaying dowel
17b - swaying dowel
17c - swaying dowel
17d - swaying dowel
40 - cover plate
53 - reflector plates
54 - reflector plates
310e - hole edge
310f - projecting portion
310h - hole 1 - boss plate
1a - exposure aperture
1c - long hole
1h - shaft
1j - shaft
10 - lower diaphragm
10a - slit forming edge
11 - cover blades
12 - cover blades
13 - cover blades
18 - charge lever
18a - armature portion
18b - input pin
18d - armature portion
29 - drive member
29a - armature
29b - armature
29c - armature
29d - armature portion
29e - spring hook
30 - roller
31 - power spring
32 - armature
33 - shaft
34 - yoke
35 - coil
51 - photo reflector
52 - photo reflector
453 - photo reflector
454 - photo reflector
455 - photo reflector

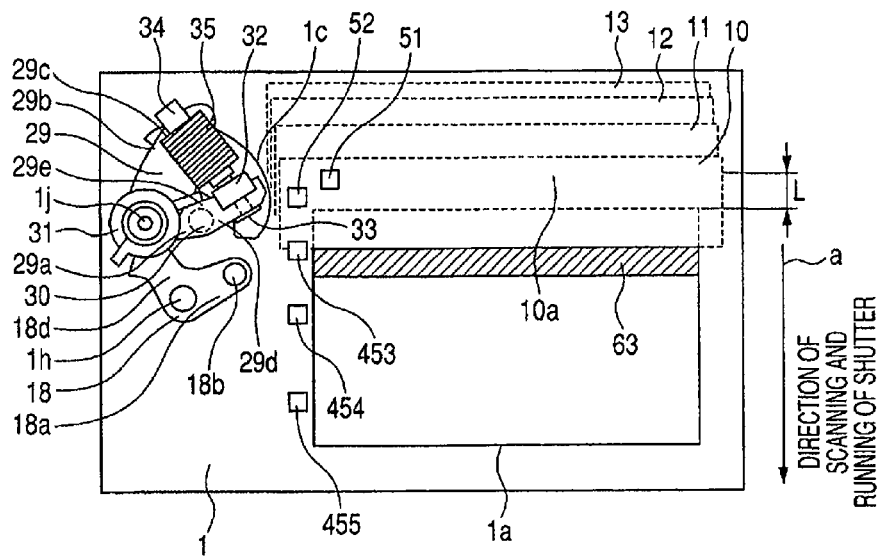

FIG. 26

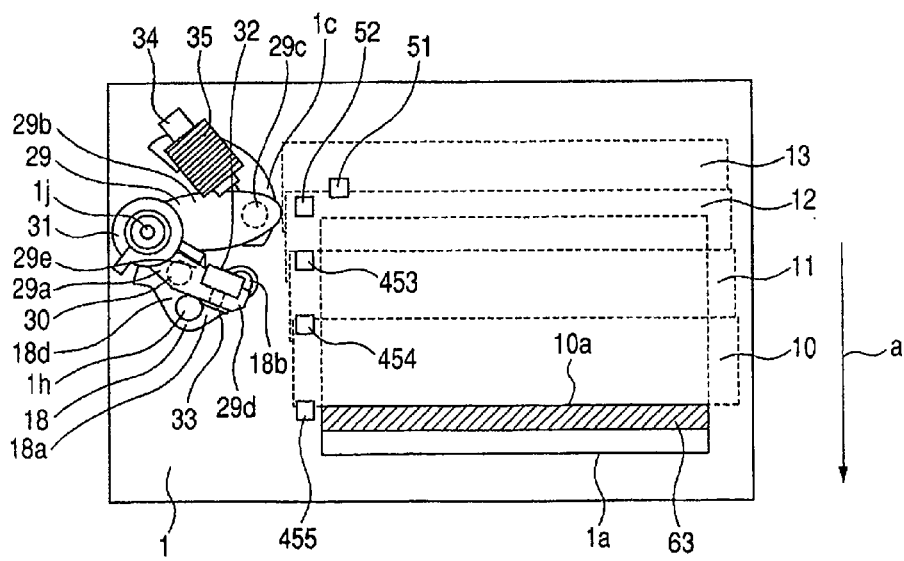

FIG. 27

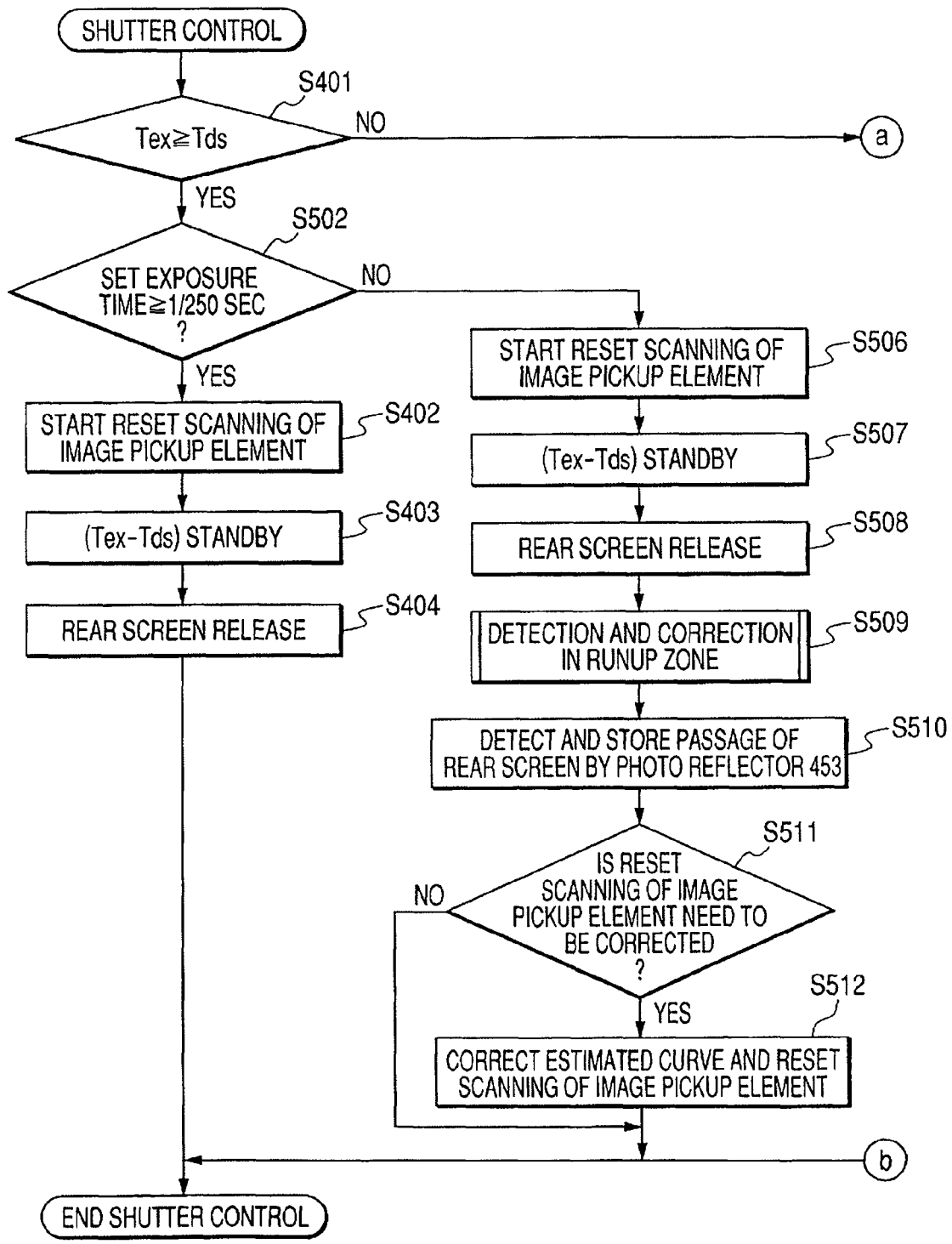

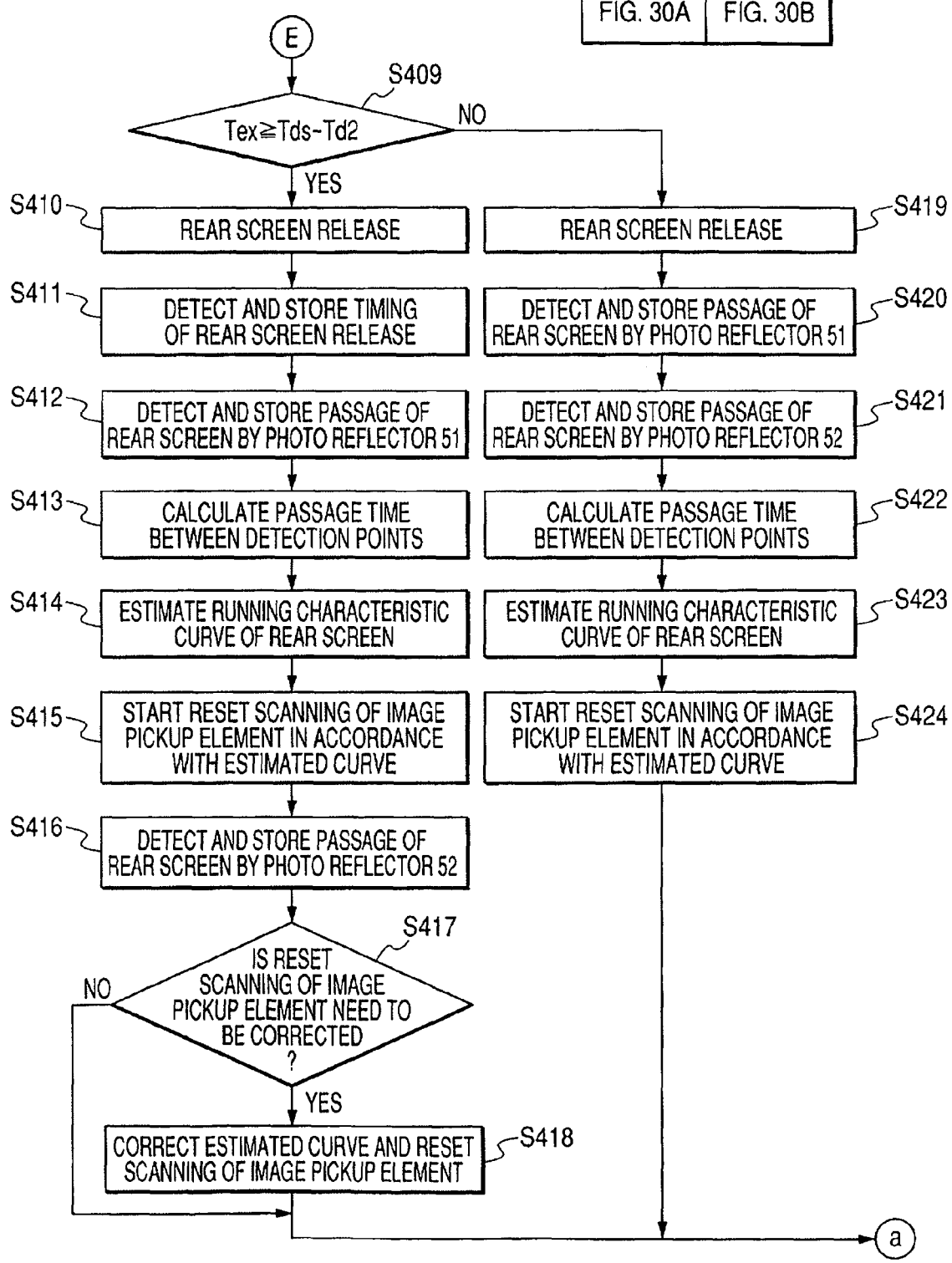

IMAGE PICKUP APPARATUS AND CONTROL METHOD THEREFOR

BACKGROUND OF THE INVENTION

1. Field of the Invention

The present invention relates to an image pickup method and a control method for the same, more particularly to an image pickup apparatus equipped with an image pickup element having an electronic shutter function, and a shutter apparatus for shielding such an image pickup element and a control method for the same.

2. Related Background Art

Some conventional digital cameras achieve a viewfinder function that enables observation of an object to be photographed by sequentially displaying picked up images of the object on a monitor such as an LCD. In this type of digital cameras also, various shutter apparatuses can be used.

In the following, some conventional shutter apparatuses will be described.

Firstly, there is a shutter apparatus (a first shutter structure) used in silver-halide film cameras. This conventional shutter apparatus has two sets of diaphragm unit pivotally supported on a shutter substrate, in which multi-divided diaphragm units are rotatably held by two arms respectively to form a parallel link. One of the diaphragm units is composed of a plurality of front blades (which are also referred to as a front screen) for changing a shielded state of the shutter aperture into an opened state upon exposure from a shielded state. The other diaphragm unit is composed of a plurality of rear blades (which are also referred to as a rear screen) for changing the opened state of the shutter aperture into a shielded state upon exposure from an open state. The front blades are linked with a front drive member including a drive source such as a spring for moving the blades and an armature to be attracted and held by a control magnet. In the photographing standby state, the armature is caused by a charge lever to be in contact with a yoke attraction surface of the control magnet, so that the front blades are kept in a state for shielding the shutter aperture. The rear blades are also linked with a rear drive member having the same structure as that for the front blades. In the photographing standby state, the armature for the rear blades is caused by the charge lever to be in contact with a yoke attraction surface of the control magnet, so that the rear blades are kept in a state for leaving the shutter aperture open. After shutter release, the charge lever is retracted from its blade holding position, and the front blades and the rear blades are kept in their start positions by magnetic forces of the control magnets supplied with electric power. Then, power supply to the control magnet for the front blades is shut off, so that the front blades move to open the shutter aperture. After a predetermined time, power supply to the control magnet for the rear blades is shut off, so that the rear blades move to shield the shutter aperture. In this way, an image area is exposed with an exposure time. After running, the front blades and the rear blades are moved to the respective photographing standby positions in preparation for the next exposure.

Further, there is a focal plane shutter for a digital camera (a second shutter structure) as disclosed in Japanese Patent Application Laid-Open No. 2002-023220. In this structure, when power of the camera is turned on, a rear diaphragm that have shielded the shutter aperture is moved to a set position by a setting member (similar to the charge lever) to open the shutter aperture, so that the object can be observed by a monitor such as an LCD. Upon shutter release, the setting member operates to cause a front diaphragm to close the shutter aperture, and after completion of preparation for exposure, the setting member returns to the initial position before setting, prior to start of exposure operation, so that the front diaphragm and the rear diaphragm run for exposure.

Furthermore, there is a focal plane shutter for a digital camera (a third shutter structure) as disclosed in Japanese Patent Application Laid-Open No. 2001-215555. In this structure, in the photographing standby state in which power of the camera is on, a setting member brings a second drive member for a front diaphragm (the second drive member being adapted to receive a force for moving the front diaphragm from a drive spring) and a rear diaphragm drive member to their set states. By this operation, the rear diaphragm that has shielded the shutter aperture is moved to a set position, and the front diaphragm is left at its running completion position. Thus, the shutter aperture is in the open state to allow observation of the object by a monitor such as an LCD. Upon shutter release, the setting member returns to the initial position before setting in conjunction with the mirror-up operation. Through this operation, a first driving member for the front diaphragm that has been retained by a cam of the setting member is released to be free, so that the front diaphragm is operated by a weak setting spring to close the shutter aperture. After completion of preparation for exposure, the front diaphragm and the rear diaphragm run for exposure.

Japanese Patent Application Laid-Open No. H11-041523 discloses an image pickup apparatus that can perform motion picture photographing without suffering from smear and also perform still picture photographing with sufficient accuracy in shutter operations (a fourth shutter structure). In this structure, charge accumulation start scanning by an image pickup element is performed to function as an electronic front screen in conformity with the running speed of a mechanical shutter functioning as a rear screen. Then, running of the mechanical shutter as the rear screen is performed as closing running to enable an exposure operation in still picture photographing in the image pickup apparatus disclosed in this document.

In the above-described first shutter structure, when the object to be photographed is to be observed through the viewfinder function of the monitor such as an LCD, it is necessary that the front diaphragm is driven in such a way as to open the shutter aperture fully, since it is necessary that an object image is picked up by the image pickup element. In the conventional shutter apparatus, the front blade control magnet is adapted to attract the armature with power supply to a coil to hold the front blades at the running start position. When a start signal for starting the operation of causing the front blades to open the shutter aperture is received, power supply to the coil of the front blade control magnet is shut off, and contact of the armature and the yoke by attraction is released, so that the attraction surface of the magnet is left in an exposed (or uncovered) state. The attraction surface will continue to be in the exposed state until the photographer determines the composition and depresses the release button and the photographing operation is completed. There is a possibility that this state will continue for a very long time under certain circumstances. Therefore, the possibility that dusts attach on the attraction surface, which is considered to cause disadvantages such as that accuracy in the shutter time is deteriorated due to attraction failure or that the front blades cannot be held due to disability in holding the armature.

The rear blade control magnet also attracts the armature with power supply to a coil to hold the rear blades at the running start position. As described above, in the state in which the front blades have opened the shutter aperture fully in order to enable observation of the object to be photographed on the monitor such as an LCD, the charge lever has been retracted from its blades holding position. Accordingly, it is necessary that the coil of the rear blade control magnet is continuously supplied with power. This leads to an increase in the power consumption.

In addition, in the case where observation of the object to be photographed through the monitor such as an LCD continues for a long time, the temperature of the coil of the rear blade magnet to which power has been continuously supplied becomes high. If the photographer takes photographs in this state, accuracy in exposure time in high shutter speed exposures can be deteriorated, since operation characteristics of the rear blade control magnet are instable.

Further, when the photographer depresses the release button fully to start photographing, the front blades that have left the shutter aperture full open is firstly charged by the charge lever to move to the running start position prior to the above-described operations performed in silver-halide cameras after shutter release. After that, it is necessary to perform the process of supplying power to the coils of the front blade control magnet and the rear blade control magnet to attract the front and rear armatures to holds the front blades and the rear blades to the respective running start positions. Since the operation of charging the front blades is need to be performed after starting shutter release, actual exposure is delayed accordingly (to result in a large shutter time lag). Thus, photo opportunities may be missed and comfort in photographing may be impaired.

In the above-described second shutter structure, the operation of charging the front diaphragm needs to be performed after starting shutter release, and actual exposure is delayed accordingly (to result in a large shutter time lag). Thus, photo opportunities may be missed and comfort in photographing may be impaired.

In addition, existence of the mechanical front screen requires a space for accommodation thereof. This leads to disadvantages such as an increase in the camera size, complex structures with many parts and an increase in the cost.

In the third shutter structure, the front diaphragm charging operation after starting shutter release is not necessary to be performed. Accordingly, disadvantages the first and second shutter structures suffer such as delay in actual exposure, missing photo opportunities and impairment of comfort in photographing are eliminated. However, a larger space is needed for the structure for driving the front screen, since a mechanical front screen is used, the front diaphragm drive lever has a double structure, and the setting spring for quickly moving the front diaphragm to the start position has been added. Therefore, the structure is more complex and including a large number of parts, which leads to an increase in the cost.

In the above-described fourth shutter structure, there is no mechanical front diaphragm (front screen). Therefore, the disadvantage of the first shutter structure that attraction failure of the front diaphragm control magnet due to attachment of dusts on the attraction surface of the front diaphragm control magnet leads to deterioration in shutter time accuracy or failure in holding the front diaphragm due to disability in holding the armature is eliminated. Since the operation of charging the front diaphragm after starting shutter release is not necessary, disadvantages such as delay in actual exposure, missing photo opportunities and impairment of comfort in photographing are also eliminated.

However, in the above-described fourth shutter structure, how running characteristics of the shutter apparatus are to be detected has not been proposed specifically.

For example, the running status of the rear screen of a mechanical shutter may be detected by a pair of photo reflectors as disclosed in Japanese Patent Application Laid-Open No. 2001-235779. In this case, one of the photo reflectors is disposed at a position for detecting the edge of the rear shutter screen near the upper edge of the aperture (shutter aperture). The other photo reflector is disposed at a position for detecting the edge of the rear shutter screen near the lower edge of the aperture (shutter aperture). In this structure, detection of running of the rear shutter screen is completed at a point just before completion of exposure. Therefore, information obtained by the detection is not reflected in charge accumulation start scanning by the image pickup element, which functions as an electronic front screen, until the next shooting. If the next shooting is performed under the conditions same as those in the last shooting, still picture photographing can be performed with a sufficient degree of accuracy in shutter operation. However, there is no guarantee that the next shooting will be performed under the conditions same as those in the last shooting.

Conditions that may vary include the attitude (or orientation) of the image pickup apparatus (camera), temperature, humidity, electric power, number of operations, shooting interval etc. Therefore, there is the disadvantage that still picture photographing cannot be performed with a sufficient degree of accuracy in shutter operation.

The present invention has been made in view of the above-described problems and has as an object to shorten the shutter release time lag with a simple structure and enable shutter control with high accuracy in shutter time.

SUMMARY OF THE INVENTION

At least one exemplary embodiment is directed to an image pickup apparatus comprising:

an image pickup element that converts an optical object image incident thereon into an electric image signal to output it;

a shutter apparatus having a screen for shielding an exposure aperture for the image pickup element;

a reset circuit for reset scanning the image pickup element on a predetermined unit-batch-by-unit-batch basis sequentially in a running direction of the screen;

a plurality of detection circuits disposed at different positions along the running direction of the screen for detecting passing of the screen after start of running of the screen for shielding the exposure aperture and before it runs over the exposure aperture; and a control circuit that estimates a running characteristic of the screen during running based on a detection result by the plurality of detection circuit and controls reset scanning by the reset circuit in conformity with the estimated running characteristic.

Accordingly another exemplary embodiment is directed to an image pickup apparatus comprising:

an image pickup element that converts an optical object image incident thereon into an electric image signal to output it;

a shutter apparatus having a screen for shielding an exposure aperture for the image pickup element;

a reset circuit for reset scanning the image pickup element on a predetermined unit-batch-by-unit-batch basis sequentially in a running direction of the screen;

at least one detection circuit for detecting passing of the screen after start of running of the screen for shielding the exposure aperture and before it runs over the exposure aperture; and a control circuit that estimates a running characteristic of the screen during running based on time at which a command for starting running of the screen is received and a detection result by the detection circuit and controls reset scanning by the reset circuit in conformity with the estimated running characteristic.

Accordingly another exemplary embodiment is directed to a control method for an image pickup apparatus having an image pickup element that converts an optical object image incident thereon into an electric image signal to output it, a shutter apparatus having a screen for shielding an exposure aperture for the image pickup element and a plurality of detection circuits disposed at different positions along the running direction of the screen for detecting passing of the screen after start of running of the screen for shielding the exposure aperture and before it runs over the exposure aperture, the method comprising:

a reset step of starting reset scanning for resetting the image pickup element on a predetermined unit-batch-by-unit-batch basis sequentially in a running direction of the screen before starting shielding of the exposure aperture by the screen;

a screen running step of starting running of the screen;

a detection step of detecting passing of the screen by the plurality of detection circuits;

an estimation step of estimating a running characteristic of the screen during running based on a detection result by the plurality of detection circuits; and a control step of controlling the reset scanning in conformity with the estimated running characteristic.

Accordingly another exemplary embodiment is directed to a control method for an image pickup apparatus having an image pickup element that converts an optical object image incident thereon into an electric image signal to output it, a shutter apparatus having a screen for shielding an exposure aperture for the image pickup element and at least one detection circuits for detecting passing of the screen after start of running of the screen for shielding the exposure aperture and before it runs over the exposure aperture, the method comprising:

a reset step of starting reset scanning for resetting the image pickup element on a predetermined unit-batch-by-unit-batch basis sequentially in a running direction of the screen before starting shielding of the exposure aperture by the screen;

a screen running step of starting running of the screen;

a detection step of detecting passing of the screen by the detection circuit;

an estimation step of estimating a running characteristic of the screen during running based on time at which a command for starting running of the screen is received and a detection result by the detection circuit; and a control step of controlling the reset scanning in conformity with the estimated running characteristic.

Other objects and advantages besides those discussed above shall be apparent to those skilled in the art from the description of preferred embodiments of the present invention that follow. In the description, reference is made to accompanying drawings, which form part thereof, and which illustrate examples of the invention. Such examples, however, are not exhaustive of the various embodiments of the invention, and therefore reference is made to the claims which will follow the description for determining the scope of the invention.

BRIEF DESCRIPTION OF THE DRAWINGS

FIG. 22 is a plan view showing the state of the rear diaphragm after completion of shutter running of the focal plane shutter, in the second embodiment of the present invention.

FIG. 23 is a plan view showing the structure of the focal plane shutter viewed from the photographing unit side of a shutter base plate in a state in which shutter running in a shutter run-up zone has just started, in a third second embodiment of the present invention.

FIG. 26 is a plan view showing the structure on the photographing unit side of a shutter base plate of the focal plane shutter in a state in which the shutter is running, in a fourth embodiment of the present invention.

FIG. 27 is a plan view showing the structure on the photographing unit side of a shutter base plate of the focal plane shutter in a state in which the shutter is running, in the fourth embodiment of the present invention.

DETAILED DESCRIPTION OF THE PREFERRED EMBODIMENTS

In the following, the best mode for carrying out the present invention will be described in detail with reference to the accompanying drawings. However, the dimensions, shapes and relative arrangements of the parts illustrated in the embodiments are to be modified fitly depending on the structure of the apparatus to which the invention is to be applied or other various conditions, and the present invention is not limited to those exemplary parts.

Firstly, the overall structure of an image pickup apparatus according to an embodiment of the present invention will be described.

Figure 1:
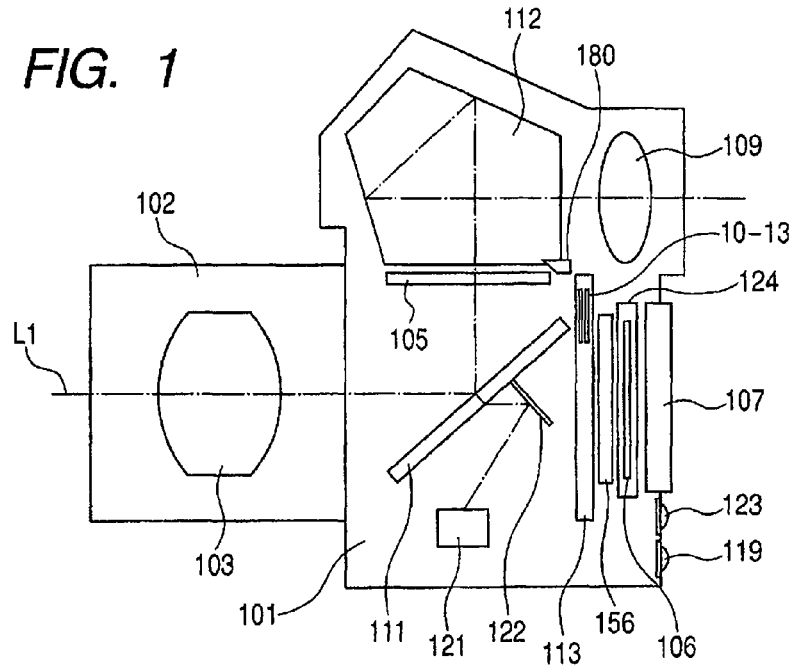
FIG. 1 is a central longitudinal cross sectional view as seen from the side showing the basic structure of an image pickup apparatus according to an embodiment of the present invention in a state for allowing observation of the object through an optical viewfinder.
Figure 2:
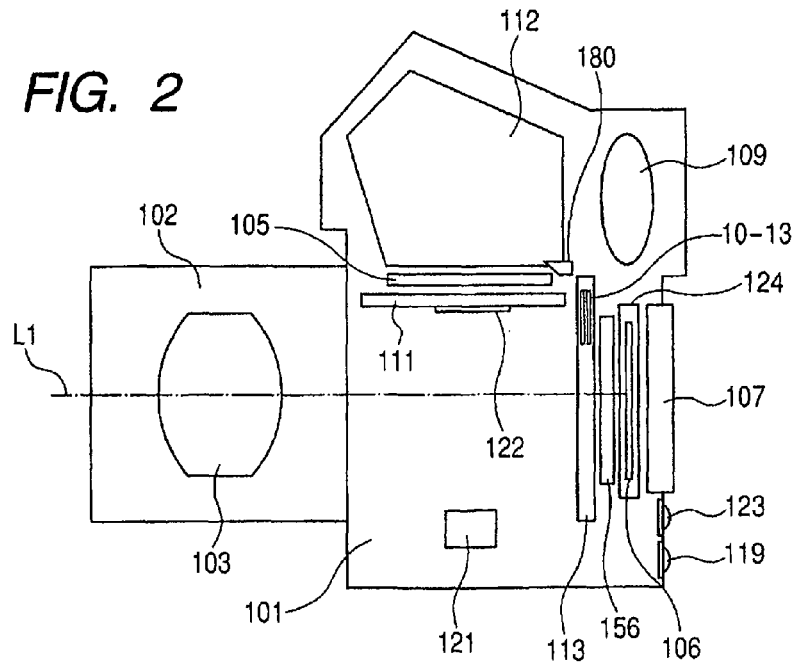
FIG. 2 is a central longitudinal cross sectional view as seen from the side showing the image pickup apparatus shown in FIG. 1 in a state for allowing observation of the object on an electronic viewfinder.

FIGS. 1 and 2 are cross sectional views showing the basic structure of an image pickup apparatus in the form of a digital single lens reflex camera system according to an embodiment of the present invention as seen from the side. FIG. 1 shows the state in which the object to be photographed is to be observed through an optical viewfinder (OVF), and FIG. 2 shows the state in which the object to be photographed is to be observed on a display apparatus 107 mounted on the rear face of the camera main body 101.

The camera of this embodiment is a digital color camera that generates an image signal representing a motion picture or a still picture by driving an image pickup element continuously or in a single-shot manner. The image pickup element is an area sensor of the type in which exposure light is converted into an electric signal on a pixel-by-pixel basis to accumulate an electric charge corresponding to the light quantity, and the electric charge is read out.

In FIGS. 1 and 2, reference numeral 101 designates a camera main body, and reference numeral 102 designates a detachable photographing lens unit having an imaging optical system 103. The photographing lens unit 102 is electrically and mechanically connected with the camera main body 101 through a known mount structure. By replacing the lens unit with photographing lens units having different focal lengths, various photographing angles of view can be obtained. The photographing lens unit 102 has a drive mechanism not shown, which is adapted to move a focusing lens that constitutes a part of the imaging optical system 103 in the optical axis L1 direction to effect focusing to an object to be photographed. Alternatively, the focusing lens may be composed of a transparent elastic member having flexibility or a liquid lens in which focusing to an object to be photographed is effected by varying the shape of an interface to change the refractive power.

Reference numeral 106 designates an image pickup element housed in a package 124. An optical low pass filter 156 for limiting the cut-off frequency of the imaging optical system 103 is provided in the optical path from the imaging optical system 103 to the image pickup element 106 in order to prevent unnecessary high spatial frequency components of object images from reaching the image pickup element 106. In addition, an infrared cut filter is provided in the imaging optical system 103.

When an object image captured by the image pickup element 106 is displayed on the display apparatus 107 mounted on the rear face of the camera body 101, a user can observe the object image directly. It is preferable that the display apparatus 107 be composed of an organic EL spatial modulation element, a liquid crystal spatial modulation element or a spatial modulation element utilizing electrophoresis of fine particles, since power consumption of these elements is low and they are thin.

The image pickup element 106 used in the embodiment of the present invention has vertical scanning means and horizontal scanning means. The vertical scanning means has a reset circuit and a readout scanning circuit. The reset scanning circuit is adapted to once reset the accumulated electric charge amounts in the pixels to zero and to perform charge accumulation start scanning (which will be referred to as reset scanning hereinafter) in which electric charge accumulation starts from that time. The readout scanning circuit performs readout scanning of the charges accumulated in the pixels.

Such an image pickup element includes a CCD sensor or a sensor compatible with the CMOS process (which will be referred to as a CMOS sensor hereinafter), which is an amplification-type solid-state image pickup element. One of the advantageous features of the CMOS sensor is that the MOS transistors in the area sensor portion and peripheral circuits such as a drive circuit for the image pickup element, an A/D conversion circuit and an image processing circuit can be formed by the same process. Accordingly, it is possible to reduce the number of the masks used and the number of the process steps greatly as compared to the CCD. In addition, it has the advantageous feature that random access to desired pixels is possible. Therefore, readout of a reduced number of pixels for display purpose can be easily performed, and therefore real time electronic image display can be achieved at a high display rate. Taking advantages of these features, the image pickup element 106 can perform a display image output operation and a high resolution image output operation.

Reference numeral 111 designates a movable half mirror that splits the optical path from the imaging optical system 103 for the optical viewfinder. Reference numeral 105 designates a focusing screen disposed at the intended imaging plane of the object image. Reference numeral 112 designates a pentaprism. Reference numeral 109 designates a lens used for observing the optical viewfinder image. The focusing screen 105, the pentaprism 112 and the lens 109 constitute a viewfinder optical system. The half mirror 111 has a refractive index of approximately 1.5 and a thickness of approximately 0.5 mm. On the backside of the half mirror 111, there is provided a movable sub mirror 122, which deflects a part of light beam in the vicinity of the optical axis included in the light beams transmitted through the half mirror 111 toward a focus detection apparatus 121. The focus detection apparatus 121 effects focus detection using a phase difference detection scheme.

Two states, or the state shown in FIG. 1 and the state shown in FIG. 2 are selectively realized by changing the position of the optical path splitting system composed of the half mirror 111 and the sub mirror 122 by means of a mirror drive mechanism (not shown) composed of an electromagnetic motor and a gear train. FIG. 1 shows a first state of the optical path split in which light is guided to the viewfinder optical system, and FIG. 2 shows a second state of the optical path split in which the light fluxes coming from the imaging optical system are directly guided to the image pickup element 106. To enable quick switching between these two states, the half mirror 111 is made of a transparent resin for weight reduction. The first state is selected to allow focus detection and observation of the object to be photographed through the optical viewfinder. The second state is selected to allow generation of an image signal for display, focus detection using the image pickup element, high resolution still picture photographing and motion picture photographing.

Reference numeral 113 designates a focal plane shutter, reference numeral 119 designates a main switch, reference numeral 123 designates a viewfinder mode changing switch, and reference numeral 180 designates an in-optical-viewfinder information display apparatus. In addition, a shutter switch is also provided, though not shown in the drawings. With depression of the shutter switch by a first stroke (e.g. a halfway depressed state: the first stroke switch will be referred to as "switch SW1" hereinafter), a photographing preparation operation starts. With depression of the shutter switch with a second stroke (e.g. a fully depressed state: the second stroke switch will be referred to as "switch SW2" hereinafter), a photographing operation starts.

Figure 3:
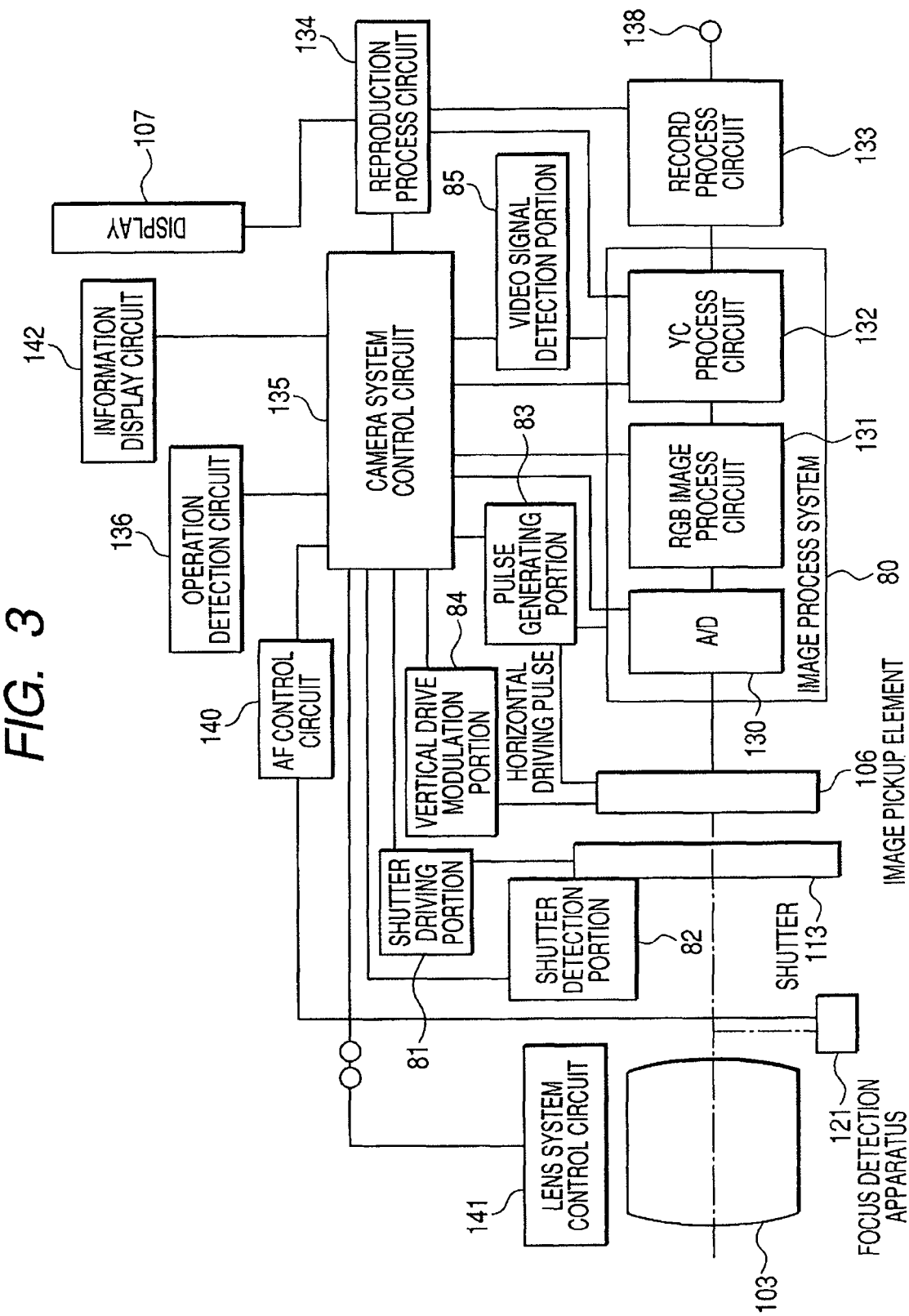
FIG. 3 is a block diagram for schematically illustrating functional configuration of the image pickup apparatus shown in FIGS. 1 and 2.

FIG. 3 is a block diagram showing the functional configuration of the digital camera shown in FIGS. 1 and 2. The elements same as those shown in FIGS. 1 and 2 are designated by the same reference signs, and descriptions thereof will be omitted.

The camera of this embodiment has an image pickup system, an image processing system, a record reproduction system and a control system. The image pickup system includes the imaging optical system 103 and the image pickup element 106. The image processing system 80 includes an A/D converter 130, an RGB image processing circuit 131 and a YC processing circuit 132. The record reproduction system includes a record processing circuit 133 and a reproduction processing circuit 134. The control system includes a camera system control circuit 135, an operation detection circuit 136, a pulse generating portion 83 and a vertical drive modulation portion 84. Reference numeral 138 designates a connection terminal for connection with an external device such as a computer to allow data transmission and reception.

The image pickup system is an optical processing system for focusing the light from the object through the imaging optical system 103 onto the image pickup surface of the image pickup element 106 to form an image. An aperture stop (not shown) of the photographing lens unit 102 and the focal plane shutter 113 are adjusted so that the image pickup element 106 is exposed to object light with an appropriate light quantity. The focal plane shutter 113 is controlled by a shutter drive portion 81 to open the shutter exposure aperture when the object is to be observed on the display apparatus or when motion picture photographing is performed. In still picture photographing, the focal plane shutter 113 is controlled in such a way as to close the shutter exposure aperture at predetermined timing. Reference numeral 82 designates a shutter detection portion composed of two sets of photo reflectors and reflection plates for detecting drive status of the shutter. The structure of the shutter detection portion will be described in detail later. The image pickup element 106 is, for example, an image pickup element having approximately ten million square pixels in total with 3700 pixels along the longer side and 2800 pixels along the shorter side. In this image pickup element, red (R), green (G) and blue (B) color filters are alternately arranged on the pixels to form what is called a Bayer pattern. In the Bayer pattern, the number of the G pixels to which observers are more sensitive when they see images is made larger than the number of the R or B pixels to enhance the overall image quality. In the image processing using this type of image pickup element, in general, a brightness signal is generated mainly from the G pixels, and color signals are generated from the R, G and B pixels. Needless to say, the number of the pixels and the type of the color filter is not limited to those described above, and they may be changed fitly in known ways.

The image pickup element 106 is supplied with a scan clock and a predetermined control pulse that will be described later from the pulse generating portion 83. A clock for vertical scanning included in the scan clocks generated by the pulse generating portion 83 is supplied to the image pickup element 106 after modulated to a predetermined frequency by the vertical drive modulation portion 84. The pulse generating portion 83 also supplies a clock signal to the image processing system 80.

The image processing system 80 is a processing system that applies certain processing on image signals read out from the image pickup element 106. Image signals read out from the image pickup element 106 are firstly converted into digital image signals by the A/D converter 130. The A/D converter 130 is a signal conversion circuit for converting the signals from the exposed pixels into digital signals of, for example, 10 bits in accordance with the amplitudes of the respective signals. Accordingly, subsequent image signal processing is performed as digital processing.

The RGB image processing circuit 131 is a signal processing circuit that processes image signals of 3700×2800 pixels received from the image pickup element 106 via the A/D converter 130. The RGB image processing circuit 131 has a white balance circuit, a gamma correction circuit and an interpolation calculation circuit for increasing the resolution by interpolation calculation.

The YC processing circuit 132 is a signal processing circuit that generates brightness signals Y and color-difference signals R−Y, B−Y (chroma signals). The YC processing circuit 132 is composed of a higher range brightness signal generating circuit that generates higher range brightness signals YH, a lower range brightness signal generating circuit that generates lower range brightness signals YL and a color difference signal generating circuit that generates color difference signals R−Y, B−Y. The brightness signal Y is generated by synthesizing the higher range brightness signal YH and the lower range brightness signal YL. The brightness signal Y and the color difference signals R−Y, B−Y (chroma signals) output from the YC processing circuit 132 will be collectively referred to as "YC signals" hereinafter.

The record reproduction system is a processing system that is adapted to output image signals to a memory or an external recording medium and output image signals to the display apparatus 107. In the record reproduction system, the record processing circuit 133 executes writing and reading processing to and from a memory or an external recording medium, and the reproduction processing circuit 134 reproduces image signals read out from a memory or an external recording medium to display them on the display apparatus 107.

The record processing circuit 133 includes a compression/decompression circuit that compresses, upon recording, YC signals representing a still picture or a motion picture to be output from the YC processing circuit 132 with a predetermined compression scheme, and decompresses compressed data upon reading. The compression/decompression circuit includes a frame memory used for signal processing. YC signals output from the YC processing circuit 132 are stored in this frame memory on a frame-by-frame basis. The YC signals are read out every multiple blocks, compressed and coded. Compression and coding is effected, for example, by applying two-dimensional orthogonal transformation, normalization and Huffman coding on the image signals of each block.

The reproduction processing circuit 134 is a circuit for transforming, by matrix transformation, the brightness signal Y and color difference signals R−Y, B−Y read out through the record processing circuit 133 into signals such as RGB signals that are suitable for the display apparatus 107. The signals having been transformed by the reproduction processing circuit 134 is output to the display apparatus 107, so that a visible image is reproduced. The reproduction processing circuit 134 and the display apparatus 107 may be connected by wireless communication means such as Bluetooth. In that case, it is possible to monitor the image picked up by the digital color camera from a remote location.

A video signal detection portion 85 detects, based on a video signal on a video signal bus, the data amount of the video signal, white balance error of the color signal and high frequency components of the image signal etc. and sends the detection results to the camera system control circuit 135.

The control system detects external operations such as operations of the release button not shown and the viewfinder mode changing switch 123 etc. by means of the operation detection circuit 136, and controls the image pickup system, the image processing system and the recording system in accordance with the detection signals. For example, when depression of the release button is detected, it controls driving of the half mirror 111 and the sub mirror 122, driving of the image pickup element 106, operation of the RGB image processing circuit 131 and compression process of the recording reproduction circuit 133. In addition, the control system controls, by means of an information display circuit 142, the status of each segment of the in-optical-viewfinder information display apparatus 180 for displaying information in the optical viewfinder.

Next, arrangements related to focus adjustment will be described.

The camera system control circuit 135 is further connected with an AF control circuit 140 and a lens system control circuit 141. Thus, various data required for various processing are exchanged through intercommunication with the camera system control circuit 135 playing the main role.

When the half mirror 111 and the sub mirror 122 are in the first state shown in FIG. 1, the AF control circuit 140 obtains a signal output of the focus detection apparatus 121 directed to a focus detection field set at a predetermined position on the image pickup area. The AF control circuit 140 generates a focus detection signal based on this signal output to detect the focus state of the imaging optical system 103. If a defocus is detected, the AF control circuit 140 converts it into a drive amount of the focusing lens, which constitutes a part of the imaging system 103, and sends it to the lens system control circuit 141 via the camera system control circuit 135. In the case where the object to be photographed is moving, it commands a focusing lens drive amount based on estimation of the right lens position taking into account the time lag from the time at which the release button was depressed to the time at which the actual photographing control operation will start. When the luminance of the object to be photographed is low and it is determined that sufficient accuracy in focus detection is not expected, the object is illuminated by a flash emission apparatus, a white LED or a fluorescent tube that are not shown in the drawings.

On the other hand, in the case where the half mirror 111 and the sub mirror 122 are in the second state shown in FIG. 2, the camera system control circuit 135 receives a result of detection of high frequency components of the video signal from the video signal detection portion 85. Then, the camera system control circuit 135 sends the focusing lens drive amount to the lens system control circuit 141 (so-called TV-AF).

Upon receiving the focusing lens drive amount, the lens system control circuit 141 effects operations such as moving the focusing lens in the optical axis direction L1 by means of a drive mechanism (not shown) provided in the photographing lens unit 102 to focus the lens on the object to be photographed. If it is detected by the AF control circuit 140 or the video signal detection portion 85 that the object is in focus, the camera system control circuit 135 is informed of that fact. If switch SW2 of the release button is turned on in this state, photographing control process by the image pickup system, the image processing system and the record reproduction process is performed.

First Embodiment

In the following, the first embodiment of the present invention will be described.

Figure 4:
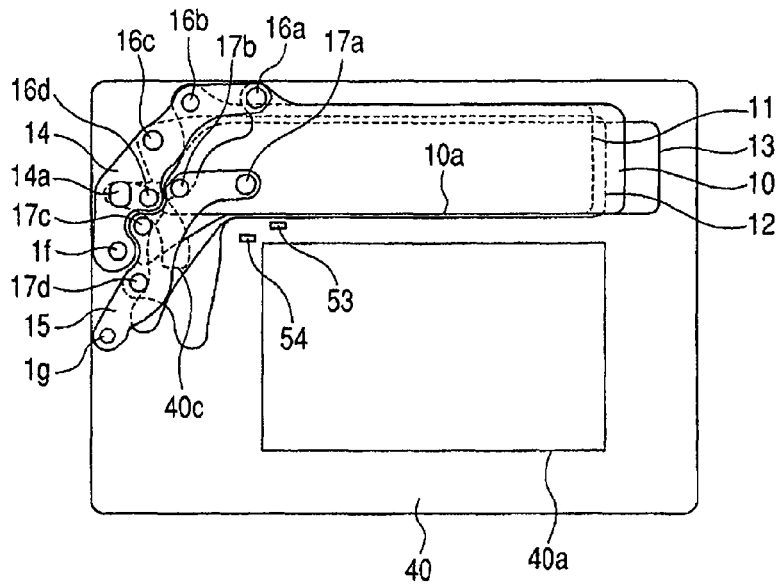
FIG. 4 is a plan view showing the status of a rear diaphragm before starting shutter running of a focal plane shutter in a first embodiment of the present invention.
Figure 5:
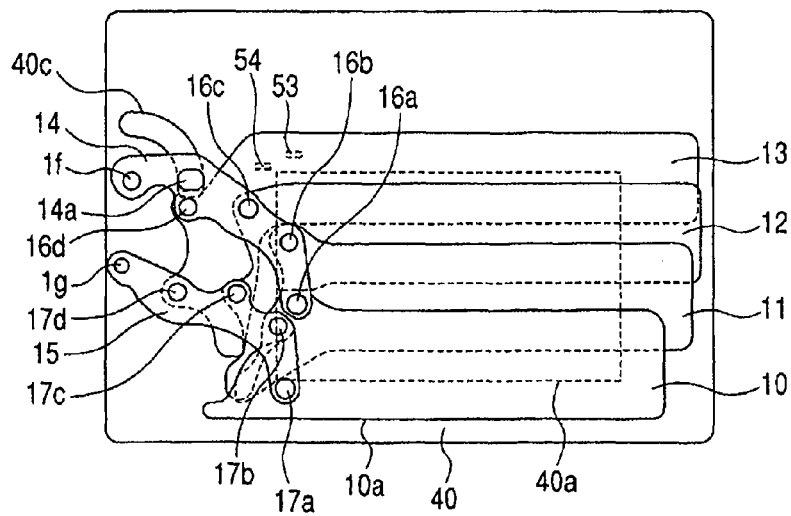
FIG. 5 is a plan view showing the status of a rear diaphragm after completion of shutter running of a focal plane shutter in a first embodiment of the present invention.

Details of the focal plane shutter 113 of the digital color camera system having the above-described structure according to the first embodiment will be described. FIGS. 4 and 5 are plan views showing the structure of the rear diaphragm. These drawings show the structure on the rear side of a shutter base plate that will be described later. FIG. 4 shows the state before shutter running starts and FIG. 5 shows the state after shutter running is completed.

In FIGS. 4 and 5, reference numeral 10 designates a rear diaphragm slit forming blade, reference numeral 10a designates the rear diaphragm slit forming edge. Designated by reference numerals 11 to 13 are rear diaphragm cover blades, where what are designated by reference numerals 11, 12 and 13 are referred to as the second rear blade, the third rear blade, and the fourth rear blade respectively. The rear diaphragm slit forming blade 10 and the rear diaphragm cover blades 11 to 13 will also be collectively referred to as the rear diaphragm unit 10 to 13. The rear diaphragm unit 10 to 13 is disposed between a cover plate 40 and the shutter base plate 1 (which will be described later) opposed to the cover plate 40 on the photographing lens unit 102 side. The space between the cover plate 40 and the shutter base plate 1 serves as the running space of the rear diaphragm unit 10 to 13. Reference numeral 14 designates a first arm for the rear diaphragm unit. The first arm 14 is pivotally mounted about the shaft if provided on the shutter base plate 1. The rear diaphragm slit forming blade 10 is pivotally supported on the first arm 14 by means of a swaging dowel 16a provided on the tip end portion of the first arm 14.

Reference numeral 15 designates a second arm, which is pivotally mounted about a shaft 1g provided on the shutter base plate 1. The rear diaphragm slit forming blade 10 is pivotally supported on the second arm 15 by means of a swaging dowel 17a provided on the tip end portion of the second arm 15. In this way, a parallel link is formed by the rear diaphragm slit forming blade 10, and the first arm 14 and the second arm 15 for the rear diaphragm. The second rear blade 11, the third rear blade 12 and fourth rear blade 13 are pivotally supported on mid portions of the first arm 14 and the second arm 15 by means of respective swaging dowels 16b and 17b, 16c and 17c, and 16d and 17d to form parallel links in a similar manner. As per the above, the rear diaphragm (which is also referred to as the rear screen after its function) is constructed.

Reference numeral 40a is a shutter exposure aperture provided on the cover plate 40, and reference numeral 40c designates a long hole that allows a drive pin for a rear diaphragm drive member 29 (which will be described later) to move along its running track.

Reference numerals 53 and 54 designate reflection plates that constitute parts of the shutter detection portion 82.

Figure 6:
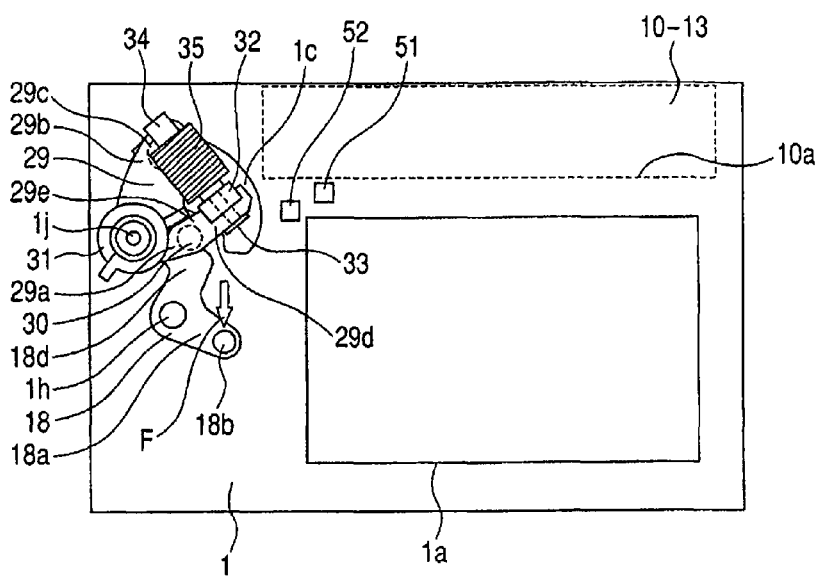
FIG. 6 is a plan view showing the structure of the focal plane shutter viewed from the photographing unit side of a shutter base plate in a shutter overcharge state in the first embodiment of the present invention.
Figure 7:
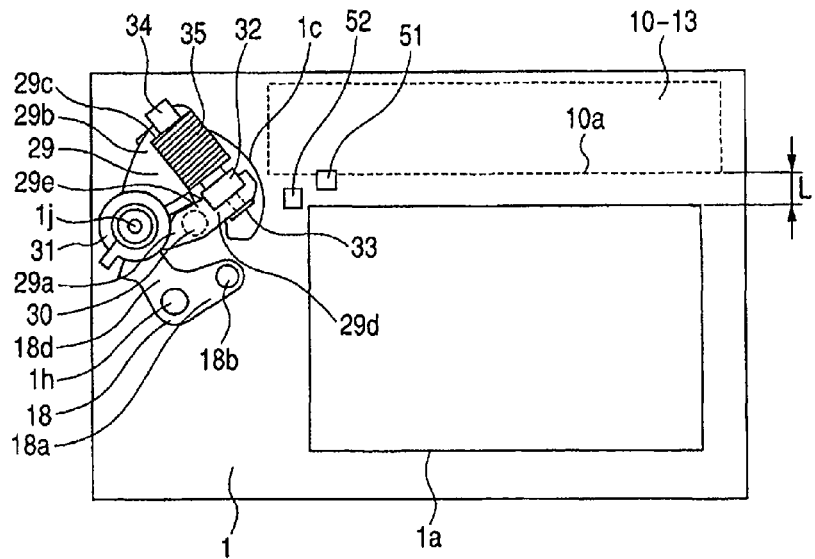
FIG. 7 is a plan view showing the structure of the focal plane shutter viewed from the photographing unit side of a shutter base plate in a state in which shutter running in a shutter run-up zone has just started, in the first embodiment of the present invention.
Figure 8:
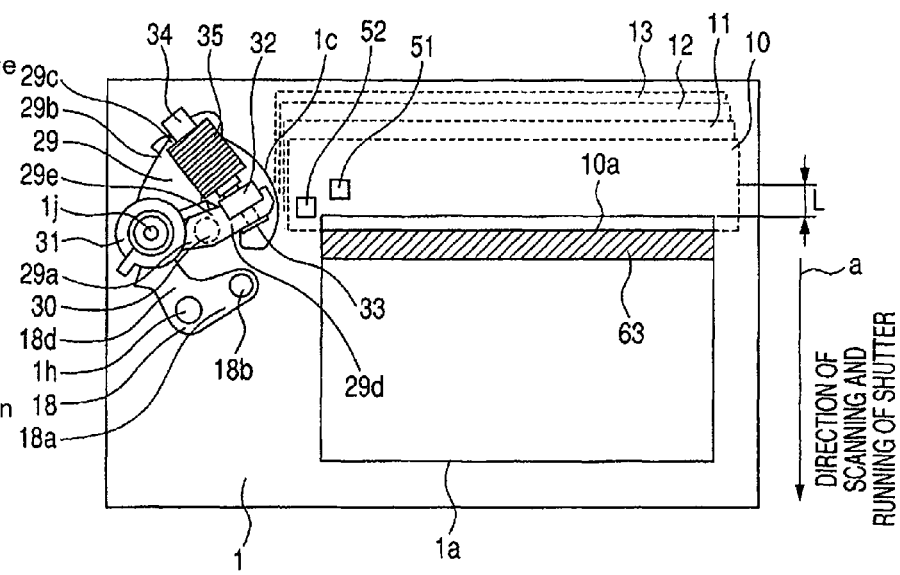
FIG. 8 is a plan view showing the structure of the focal plane shutter viewed from the photographing unit side of a shutter base plate in a state in which the shutter is running, in the first embodiment of the present invention.
Figure 9:
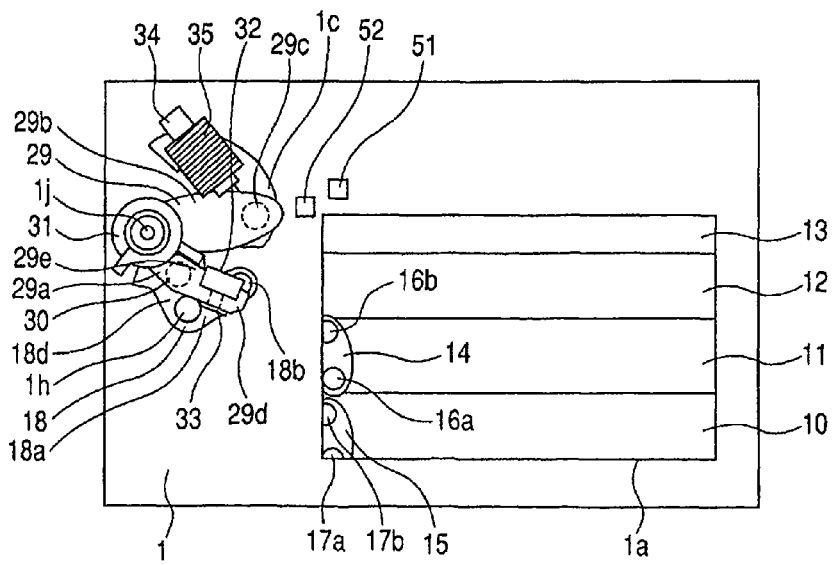
FIG. 9 is a plan view showing the structure of the focal plane shutter viewed from the photographing unit side of a shutter base plate in a state in which shutter running has been completed, in the first embodiment of the present invention.

Next, the structure on the photographing lens unit 102 side of the shutter base plate 1 will be described with reference to FIGS. 6 to 9. FIG. 6 shows a shutter overcharge state, FIG. 7 shows a state at start of running in the shutter run-up zone, FIG. 8 shows a state while the shutter is running, and FIG. 9 shows a state after shutter running has been completed.

In FIGS. 6 to 9, reference numeral 1 designates a substrate (i.e. the shutter base plate) having a shutter exposure aperture, and reference numeral 1a designates the shutter exposure aperture. Reference numeral 1c designates a long hole that allows the drive pin for the rear diaphragm drive member 29 (which will be described later) to move along its running track.

Reference numeral 18 designates a charge lever pivotally supported about a shaft 1h implanted on the shutter base plate 1. The charge lever 18 is retained by a retaining member (not shown) with small clearance gap in the thrust direction of the shaft 1h. Reference numeral 18a designates the input side arm portion of the charge lever 18, and reference numeral 18b designates an input pin integrally implanted on the input side arm portion 18a. Reference numeral 18d designates the rear diaphragm side output arm portion of the charge lever 18. The outer peripheral portion of the tip end of the rear diaphragm side output arm portion 18d serves as a circular arc cam, so that the rear diaphragm drive member 29 will not rotate after a predetermined amount of overcharge. Thus, the position of the blades after overcharge is stabilized. The charge lever 18 abuts stoppers (not shown) at the overcharge position shown in FIG. 6 and the charge lever return position shown in FIG. 7 so as to be restricted in its rotation.

Reference numeral 29 designates the rear diaphragm drive member pivotally supported about a shaft 1j implanted on the shutter base plate 1. The rear diaphragm drive member 29 is retained by a retaining member (not shown) with small clearance gap in the thrust direction of the shaft 1j. On the tip end portion of an arm 29a of the rear diaphragm drive member 29, a shaft is integrally implanted. A roller 30 is rotatably supported on that shaft (on the backside of the rear diaphragm drive member 29 in the drawings). The shutter base plate 1 functions as a retainer of the roller 30. On the tip end portion of the other arm 29b of the rear diaphragm drive member 29, a rear diaphragm drive pin 29c is integrally implanted. Reference numeral 31 designates a power spring composed of a torsion spring provided coaxially with the shaft 1j on the rear diaphragm drive member 29. One end of the power spring 31 is supported by a screen speed adjusting member not shown, and the other end is hooked on the a spring hook projection 29e of the rear diaphragm drive member. Thus, the power spring 31 exerts a clockwise rotational force on the rear diaphragm drive member 29 about the shaft 1j. An armature holding portion 29d is formed on the upper portion of the arm 29a of the rear diaphragm drive member 29 to hold an armature 32 of a magnet by an armature shaft 33 while allowing a certain degree of freedom of movement of it. Reference numeral 34 designates the yoke of the magnet, and reference numeral 35 designates the coil of the magnet fixed on a magnet base plate that is not shown in the drawing. When electric power is supplied, the magnet holds the armature 32, and when electric power supply is shut off, it releases the armature 32. The shutter time is controlled by this operation.

Reference numeral 14a shown in FIGS. 4 and 5 designates a hole into which the drive pin 29c of the rear diaphragm drive member 29 is inserted. Force is transmitted from the rear diaphragm drive member 29 whose pivot shaft 1j is provided coaxially with the shaft 1f to the first arm 14 through this hole.

Reference numerals 51 and 52 designate two sets of photo reflectors provided on the surface of the shutter base plate 1 that faces the cover plate 40. The photo reflectors 51 and 52 and reflection plates 53 and 54 provided on the cover plate 40 constitute the shutter detection portion 82. It is assumed that the distance between the rear diaphragm slit forming edge 10a and the shutter exposure aperture 1a is represented by L, coordinate Y is set in the running direction of the rear diaphragm slit forming edge 10a and an origin of the coordinate Y is set at upper edge of the shutter exposure aperture 1a. It is preferred that at least one of the photo reflectors 51 and 52 is disposed at a position in the range satisfying Y<L/2.

As described above with reference to FIGS. 4 to 9, the focal plane shutter 113 in the first embodiment does not have a front diaphragm. Accordingly, the portion below the shutter opening can be made dramatically small, and the thickness of the space in which the diaphragm unit is accommodated and runs can be reduced by approximately two thirds. Thus, it contributes to size reduction of the apparatus such as a camera.

In the focal plane shutter 113 having the above-described structure, when photographing of a still picture is performed, running of the rear diaphragm unit 10 to 13 starts from the status shown in FIGS. 4 and 6 in which the shutter exposure apertures 40a and 1a are fully open. Then, the focal plane shutter 113 runs in such a way as to undergo the statuses shown in FIGS. 7 and 8 and then to assume the status shown in FIG. 5 and 9 in which the shutter exposure apertures 40a and 1a are fully closed. Here, relationship between running of the rear diaphragm unit 10 to 13 and reset scanning of the image pickup element 106 will be briefly described with reference to FIG. 8.

Reference numeral 63 indicates a reset scanning position of the image pickup element 106. The reset scanning position 63 and the position of the rear slit forming edge 10a on the image pickup surface of the image pickup element 106 move downwardly on the image pickup surface 60 (in the direction indicated by arrow a in FIG. 8). In practice, a predetermined time after reset scanning of a certain line of the image pickup element 106 is effected, the rear diaphragm slit forming edge 10a is controlled to pass that line. With this time difference, the hatched area shown in FIG. 8 is exposed. The reset scanning position 63 and the position of the rear diaphragm slit forming edge 10a are controlled to move in such a way that they are kept substantially parallel to each other without changing the size of the hatched area shown in FIG. 8. The exposure time (shutter speed) is the time elapsed from the reset scanning to the passing of the rear diaphragm slit forming edge 10a. Referring to the image scanning direction, since the image picked up is inverted (upside down) by the photographing lens, reset scanning and shutter running progress from the lower portion to the upper portion of the image.

In the instance shown in FIG. 8, on the image pickup surface of the image pickup element 106 corresponding to the shutter exposure aperture 1a, the area below the reset scanning position 63 corresponds to the unexposed image pickup surface in which reset scanning has not been performed yet. The area between the reset scanning position 63 and the rear diaphragm slit forming edge 10a corresponds to the image pickup surface under exposure in which reset scanning has already been performed. The area above the rear diaphragm slit forming edge 10a corresponds to the already-exposed image pickup surface that is shielded by the rear diaphragm slit forming blade 10 after reset scanning and exposure.

Figure 10:
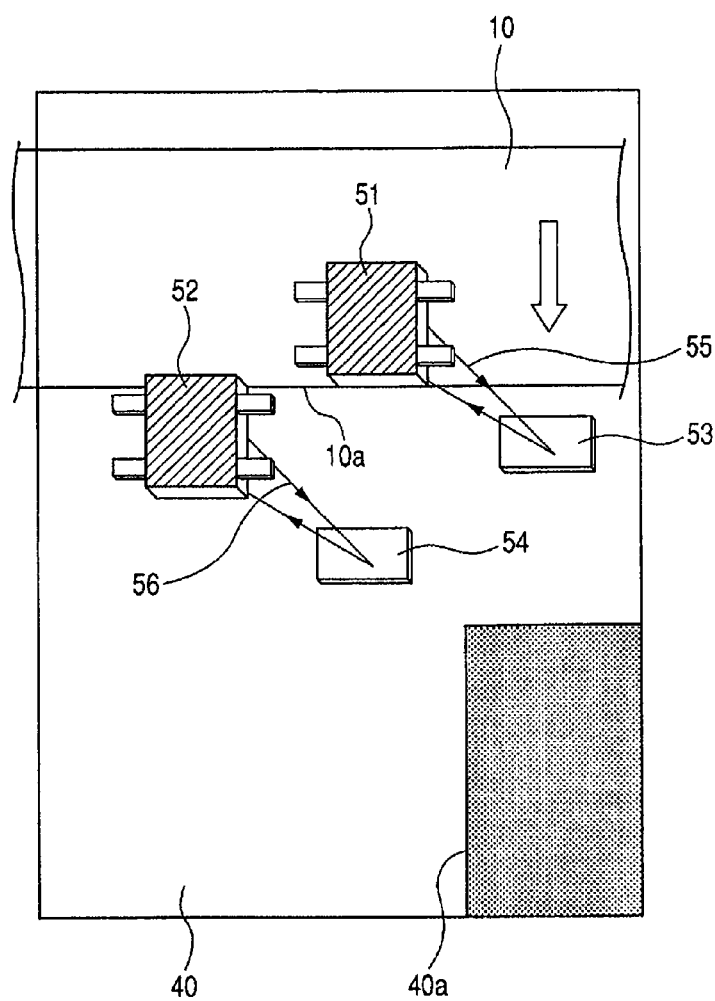
FIG. 10 is a perspective view showing the structure of a shutter detection portion, in the first embodiment of the present invention.

Next, the structure of the shutter detection portion 82 that detects the running status of the rear diaphragm will be described with reference to FIG. 10. FIG. 10 is a perspective view showing the structure of the shutter detection portion 82.

The running status of the rear diaphragm is detected by the two sets of photo reflectors 51, 52. Each of the photo reflectors 51, 52 has a light emitting portion and a light receiving portion. The photo reflectors 51, 52 are disposed on the side of the shutter base plate 1 that is opposed to the cover plate 40, in the run-up zone L (see FIGS. 7 and 8) between the running start position of the rear diaphragm slit forming edge 10a and the shutter exposure aperture 1a. In FIG. 10, the hatched surface of the photo reflectors 51, 52 are the surface to be attached to the shutter base plate 1.

At the positions on the cover plate 40 that are opposed to the photo reflectors 51 and 52, the reflection plates 53 and 54 are attached respectively. Light beams 55 and 56 emitted from the respective light emitting portions of the photo reflectors 51, 52 are respectively reflected by the reflection plates 53, 54 respectively, received by the light receiving portions of the photo reflectors 51, 52 and converted into electric signals. The rear diaphragm unit 10 to 13 has a very low reflectivity as compared to the reflection plates 53 and 54. Therefore, when the reflection plates 53 and 54 are covered by the rear diaphragm unit 10 to 13, the amounts of light received by the light receiving portions are small, since the light from the light emitting portions is blocked by the rear diaphragm unit.

Therefore, by detecting abrupt changes in the electric signals output from the light receiving portions, it is possible to detect passing of the rear diaphragm slit forming edge 10a over the positions of the reflection plates 53, 54.

To enhance accuracy in detection, it is preferred that the detection of passing of the rear diaphragm slit forming edge 10a be performed at the same position with respect to the running direction of the rear diaphragm, namely the photo reflectors 51, 52 and the reflection plates 53, 54 be arranged vertically one above the other in FIGS. 4 to 9. This is because the rear diaphragm slit forming edge 10a sometimes slants. However, in this first embodiment, the photo reflectors 51, 52 are offset from each other along the longitudinal direction (i.e. horizontal direction) orthogonal to the running direction of the rear diaphragm as shown in FIG. 10 because of the space available. Nevertheless, the influence of slanting of the rear diaphragm slit forming edge 10a during running can be substantially eliminated by minimizing the aforementioned offset.

The photo reflectors 51, 52 may be disposed in such a way as to detect passing of the rear diaphragm slit forming edge 10a at positions near the tip end portion of the diaphragm blades. However, since the tip end portion of the diaphragm blades is unstable due to flexure of the running blades, it is preferable that the detection be performed at positions near the joint portion of the diaphragm blades that are linked to the arm by the swaging dowels.

Next, shutter control in still picture photographing effected by controlling reset scanning of the image pickup element 106 and controlling driving of the focal plane shutter 113 will be described in detail.

Figure 11:
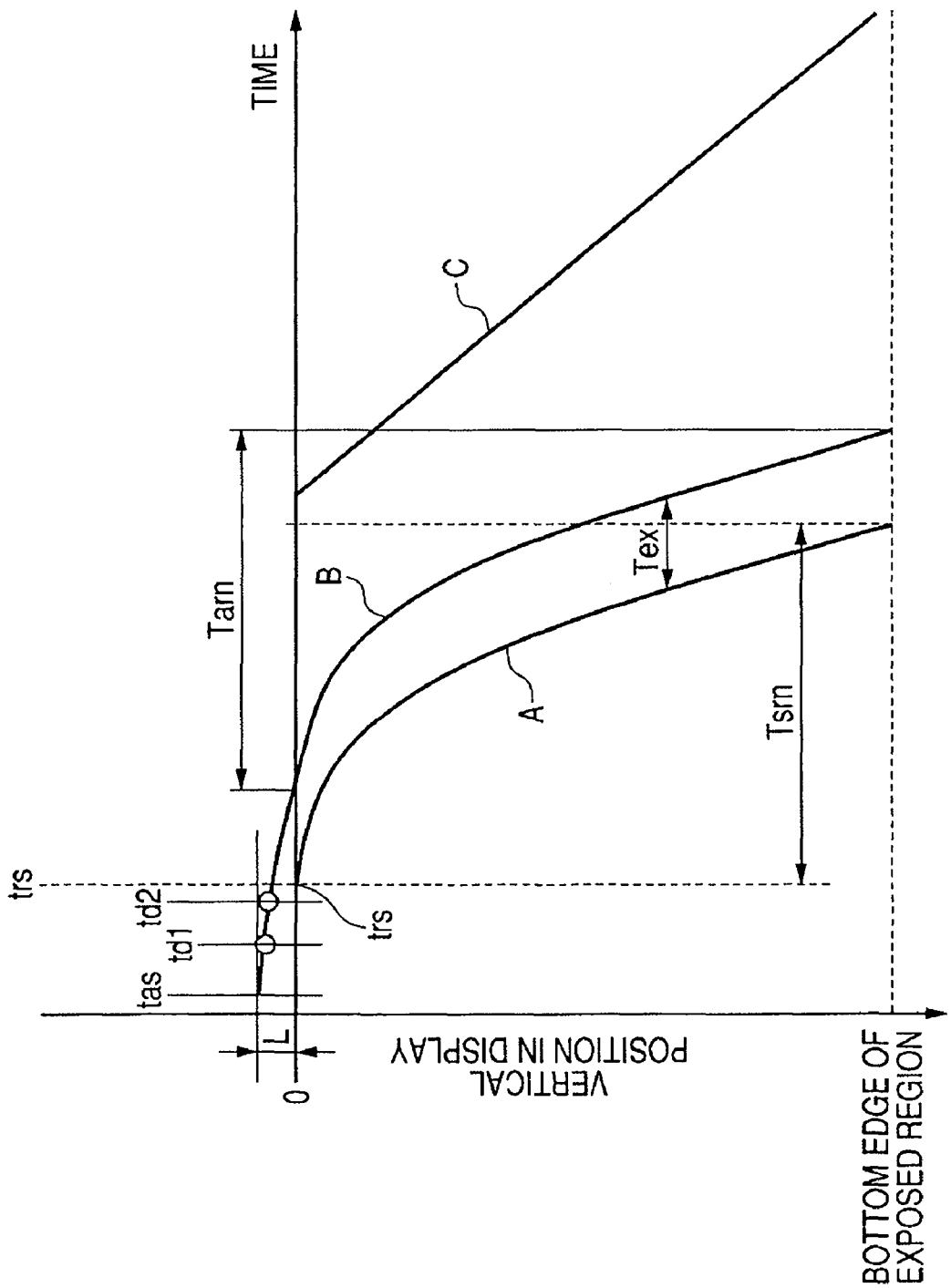
FIG. 11 is a graph showing relationship of the reset scanning position, the position of the rear diaphragm slit forming edge and the pixel signal read-out position of an image pickup element against time for the run-up zone in the image pickup apparatus according to the first embodiment of the present invention.

FIG. 11 is a graph illustrating the shutter control in still picture photographing, where the vertical axis represents position along the vertical direction on the image pickup surface of the image pickup element 106 and the horizontal axis represents time. In FIG. 11, curve A, curve B and curve C represent the reset scanning position 63 on the image pickup element 106, the position of the rear diaphragm slit forming edge 10a, and the pixel reading position of the image pickup element 106 respectively in relation to time.

While electronic image display on the display apparatus 107 and/or motion picture photographing are effected, the rear shutter diaphragm of the shutter 113 is open at all times (i.e. not running), and exposure control is effected by controlling electric charge accumulation time. In other words, exposure control is effected by controlling charge accumulation time, while leaving the rear diaphragm unit 10 to 13 in the status shown in FIGS. 4 and 6. The charge accumulation time corresponding to the exposure time in the still picture photographing is determined based on the charge output level read out in the reading scanning effected in motion picture photographing.

In FIG. 11, $t_{rs}$ is the time at which pixel reset scanning functioning as an electronic front screen starts, $t_{as}$ is the time at which shutter (rear screen) running starts, $T_{srn}$ is the time over which the electronic front screen (i.e. reset scanning) runs, $T_{arn}$ is the time over which the shutter (rear screen) runs, and Tex is the exposure time. The aforementioned reset scanning of pixels is effected for time period $T_{srn}$ from time $t_{rs}$ at a speed synchronized with running of the rear diaphragm of the shutter. The running of the rear shutter screen starts at specific time $t_{as}$ that is computed based on a predetermined exposure time Tex to block light. Time $t_{as}$ sometimes precedes time $t_{rs}$ depending on the exposure time Tex that is set firstly (specifically, in cases where time Tex is shorter than the time took by running of the shutter (rear screen) over the run-up zone L).

Read scanning of the electric charge accumulated in pixels is effected for the pixels over which the shutter (rear screen) has already run to shield them from light.

As disclosed in Japanese Patent Application Laid-Open No. H11-041523, a clock modulation circuit for modulating scanning clock frequency of reset scanning is provided for the vertical scanning means of the image pickup element. The clock frequency is modulated to conform characteristics of the scanning speed of reset scanning to characteristics of changes in the running speed of the shutter (rear screen) so that a constant exposure time Tex is maintained.

Figure 12:
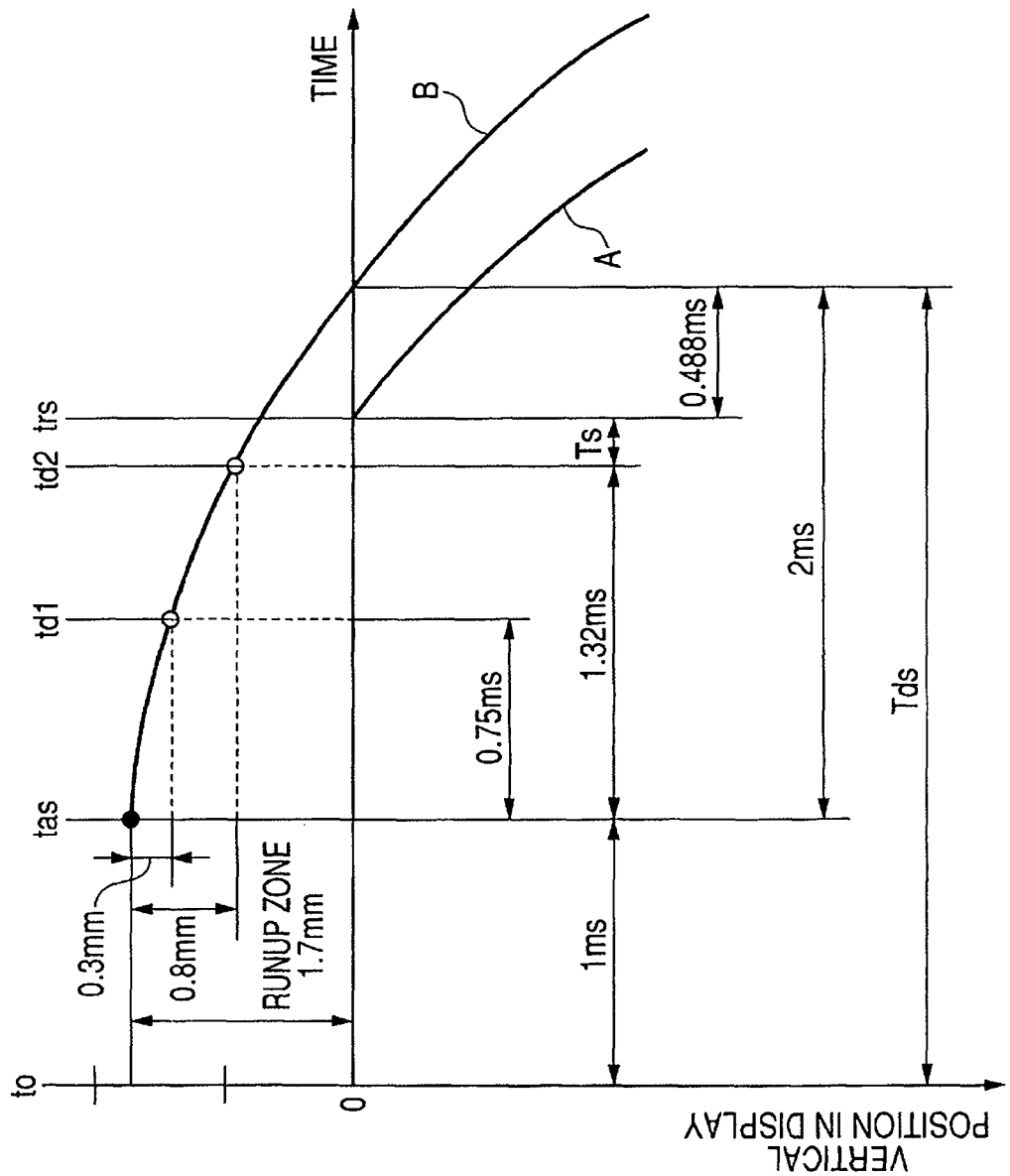
FIG. 12 is an enlarged graph similar to one shown in FIG. 11 showing relationship of the reset scanning position, the position of the rear diaphragm slit forming edge and against time for the run-up zone in the image pickup apparatus in a case where the exposure time is $1/2000$ second, the graph being directed to a certain period of time just after starting exposure.

FIG. 12 is an enlarged graph showing the portion of the graph of FIG. 11 that relates to starting of exposure for a case where the exposure time is 1/2000 second.

In FIG. 12, the horizontal axis represents time elapsed from a reference time set at the time at which a release signal for the shutter (rear screen) is generated (i.e. power supply for the rear screen control magnet is shut off), and the vertical axis represents vertical position on the image area where the origin (zero point) is set at the upper edge of the shutter exposure aperture 1a. Delay time Tds is defined as the time elapsed from the time (t0) at which a release signal for the shutter (rear screen) is generated until the time at which the rear diaphragm slit forming edge 10a reaches the shutter exposure aperture 1a.

As an instance in the case where a focal plane shutter that can achieve typical high shutter speeds is used, the length of the run-up zone of the rear screen is assumed to be 1.7 mm (−1.7 mm, in the coordinate). The time from start of running of the shutter (rear screen) (at $t_{as}$) to arrival of the diaphragm slit forming edge 10a to the shutter exposure aperture 1a is assumed to be 2 ms. Since exposure time of 1/2000 second corresponds to 0.488 ms, reset scanning starts (i.e. the electronic front screen starts) (at $t_{rs}$) 0.488 milliseconds before the rear diaphragm slit forming edge 10a reaches the shutter exposure aperture 1a.

Here, it is assumed that photo reflector 51 of the shutter detection portion 82 is located at a distance of 0.3 mm from the rear screen start position, and photo reflector 52 is located at a distance of 0.8 mm from the rear screen start position. It is assumed that the photo reflector 51 detects passing of the rear diaphragm slit forming edge 10a 0.75 milliseconds (td1) after the start of running of the rear screen, and the photo reflector 52 detects passing of the rear diaphragm slit forming edge 10a 1.32 milliseconds (td2) after the start of running of the rear screen.

What is represented by Ts is a delay time that is needed in feed back control of start of the electronic front screen. The time Ts is determined by computing, during the time between detection by the photo reflector 52 (td2) and start of reset scanning (start of the electronic front screen) (at $T_{rs}$), succeeding vertical scanning by the electronic front screen in conformity with the running characteristic of the rear diaphragm slit forming edge 10a.

It takes 1 millisecond from the time t0 at which a release signal for the shutter (rear screen) is generated until the rear screen actually starts (to move) at $t_{as}$. Accordingly, the delay time Tds between the generation of the release signal for the shutter (rear screen) to the arrival of the shutter (rear screen) to the exposure aperture 1a is 3 ms.

Figure 13:
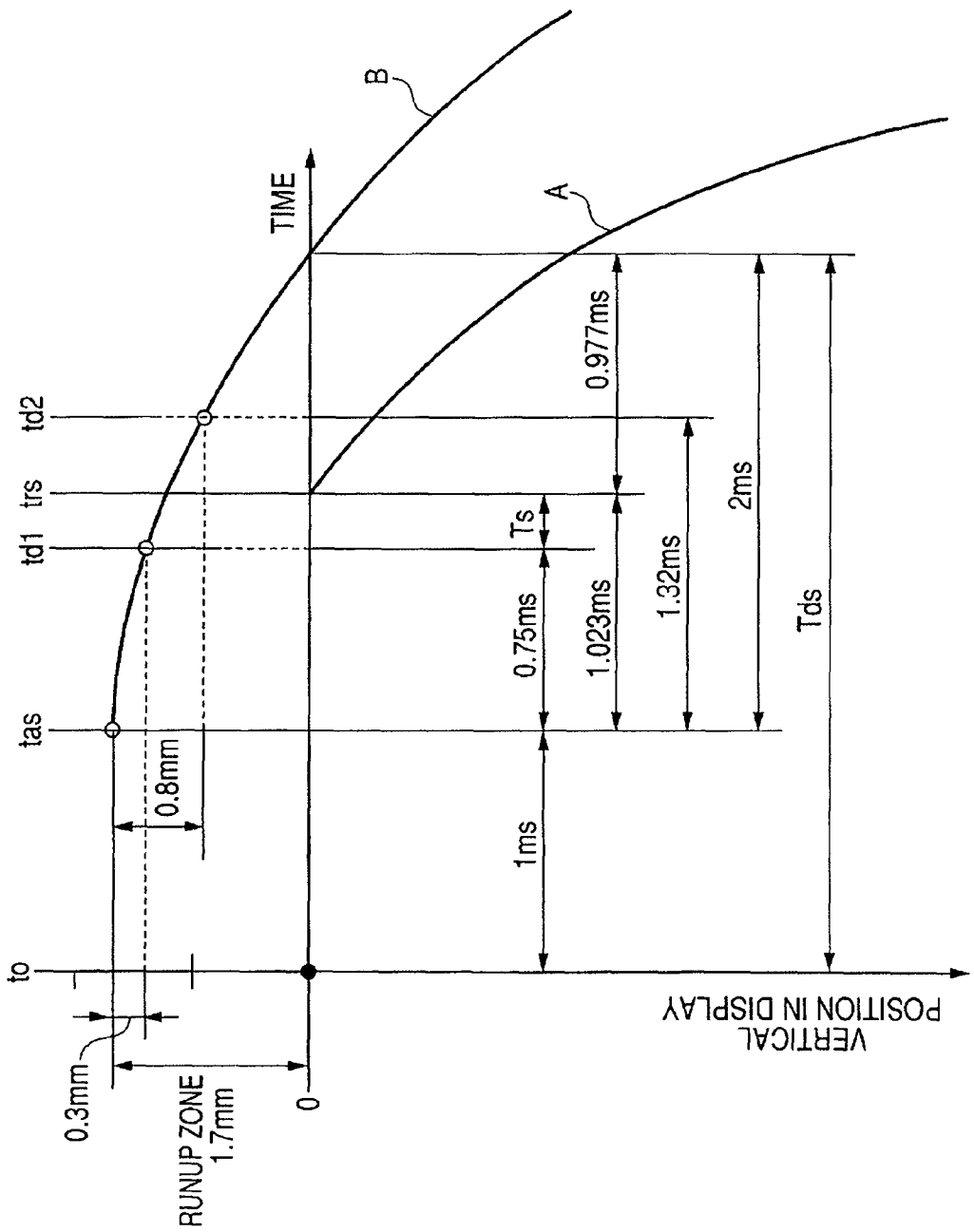
FIG. 13 is an enlarged graph similar to one shown in FIG. 11 showing relationship of the reset scanning position, the position of the rear diaphragm slit forming edge against time for the run-up zone in the image pickup apparatus in a case where the exposure time is $1/1000$ second, the graph being directed to a certain period of time just after starting exposure.

FIG. 13 is an enlarged graph showing the portion of the graph of FIG. 11 that relates to starting of exposure in a case where an exposure time is 1/1000 second.

Since exposure time 1/1000 second corresponds to 0.977 millisecond, reset scanning starts (i.e. the electronic front screen starts) ($t_{rs}$) 0.977 milliseconds before the rear diaphragm slit forming edge 10a reaches the shutter exposure aperture 1a. As described above, the time from start of running of the shutter (rear screen) at $t_{as}$ to arrival of the diaphragm slit forming edge 10a to the shutter exposure aperture 1a is 2 ms. Therefore, the reset scanning starts 1.02 milliseconds after the start of running of the rear screen.

As will be understood from FIG. 13, at the time ($t_{rs}$) the electronic front screen starts (i.e. the reset scanning starts), data detected by the photo reflector 52 is not fed back. Therefore, to recognize the running characteristic of the rear diaphragm slit forming edge 10a, another detection data that can be obtained just before starting the reset scanning (i.e. starting the electronic front screen) is needed. At the time ($t_{as}$) at which the rear screen starts, movement amount of the rear diaphragm slit forming edge 10a per unit time is small. Therefore, it is difficult to detect it by a sensor such as a photo reflector. In view of this, the time (t0) at which the release signal for the shutter (rear screen) is generated (i.e. the time at which power supply to the rear screen control magnet is shut off) is detected as a timing signal that can be accurately detected.

Figures 14, 14A:
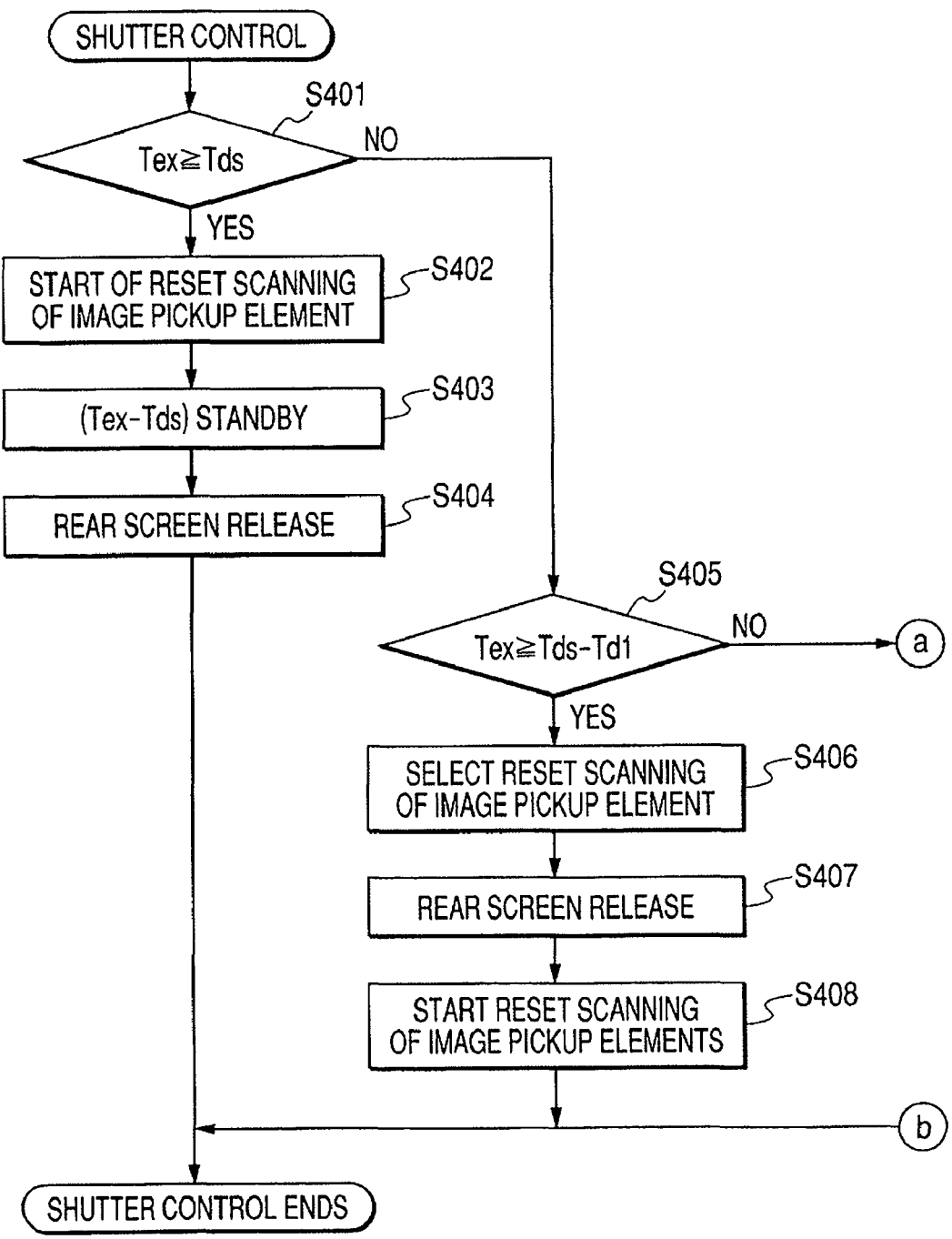
FIG. 14 is composed of FIGS. 14A and 14B showing a flow chart of a shutter control operation in the first embodiment of the present invention.
Figure 14B:
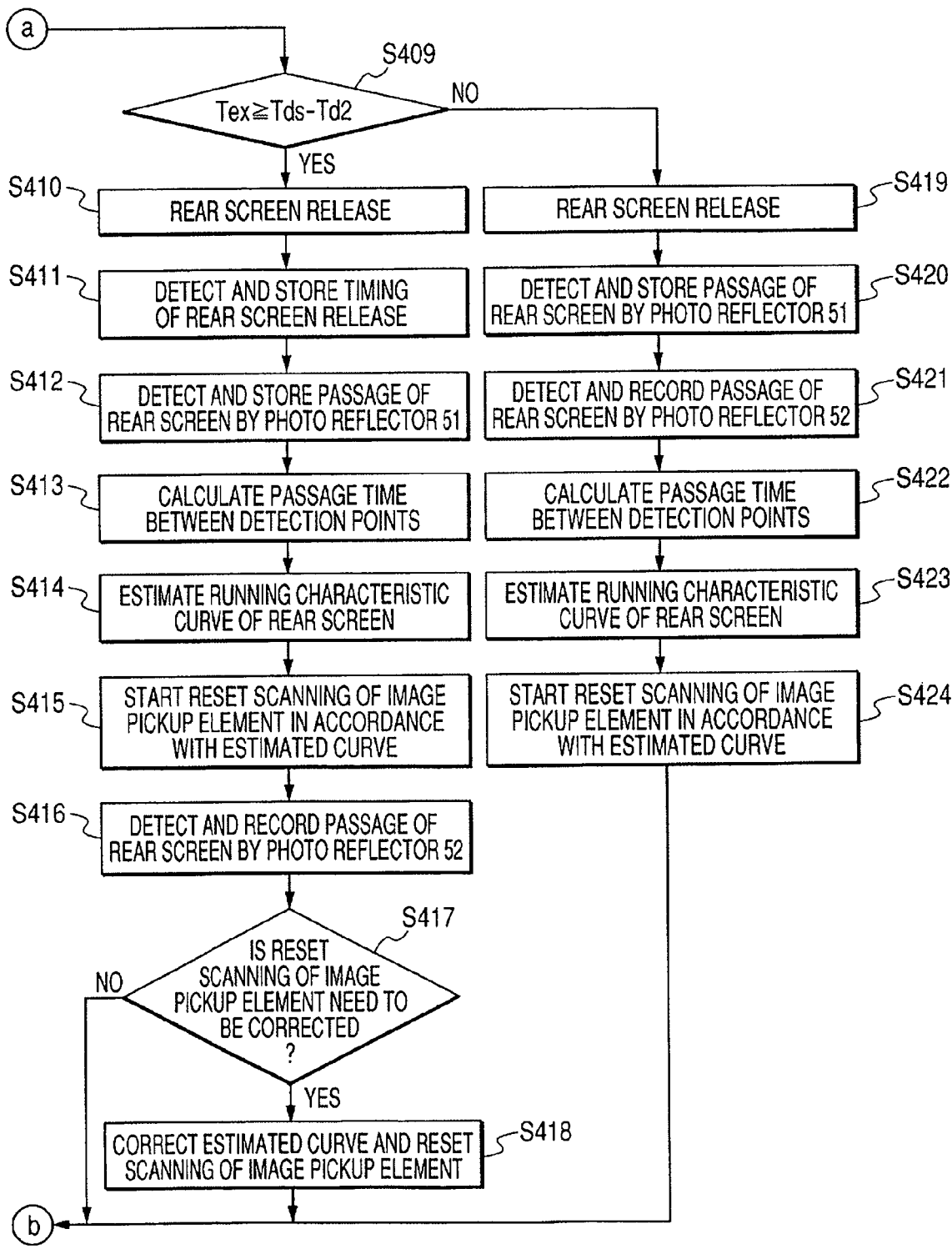

Next, a shutter control operation after a release signal for the shutter (rear screen) is generated will be described with reference to FIGS. 14A and 14B. The time from generation of the release signal for the shutter (rear screen) until detection (at td1) of the rear diaphragm slit forming edge 10a by the photo reflector 51 is represented by Td1. The time from generation of the release signal for the shutter (rear screen) to detection (at td2) of the rear diaphragm slit forming edge 10a by the photo reflector 52 is represented by Td2.

Firstly in step S401, control of the shutter 113 starts, and the exposure time Tex and the delay time Tds from generation of a release signal for the shutter (rear screen) to arrival of the rear diaphragm slit forming edge 10a to the shutter exposure aperture 1a are compared in terms of which is longer. In an instance in the case where a focal plane shutter that can achieve typical high shutter speeds is used, the delay time Tds is 3 ms. If the exposure time Tex is longer than or equal to the delay time Tds, the process proceeds to step S402.

In step S402, reset scanning is effected in conformity with specific shutter running characteristics that have been stored in advance. In step S403, the process stands by for a time period equal to the exposure time Tex minus the delay time Tds, after the start of the reset scanning.

In step S404, a shutter release signal for the shutter (rear screen) is generated. In this case, since the exposure time is long, even if there is a little difference between the actual running characteristic of the shutter (rear screen) and the reset scanning of the image pickup element, contribution of the difference on the exposure error is small. Therefore, the reset scanning of the image pickup element may be effected in conformity with a specific shutter running characteristic stored in advance.

On the other hand, if it is determined in step S401 that the delay time Tds is the larger, the process proceeds to step S405.

In step S405, a determination is made as to whether or not the exposure time Tex set is longer than the time period which is the delay time Tds minus time Td1 (Tds−Td1). If the exposure time Tex is longer or equal to the time period, the process proceeds to step S406, in which an appropriate type of reset scanning is selected among types of reset scanning processes corresponding to predetermined shutter running characteristics that have been stored in advance.

In step S407, a release signal for the shutter (rear screen) is first generated to cause the shutter (rear screen) to run. In step S408, the process controls to start the reset scanning of the type selected in step 406 after standing by for a time period equal to the delay time Tds minus the exposure time Tex. In this control, the reset scanning starts before the rear diaphragm slit forming edge 10a reaches the photo reflector 51 after the start of the shutter (rear screen). In this case, since the exposure time is sufficiently long, even if there is a little difference between the actual running characteristic of the shutter (rear screen) and the reset scanning of the image pickup element, contribution of the difference on the exposure error is small. Therefore, the reset scanning of the image pickup element may be effected in conformity with a specific shutter running characteristic stored in advance.

On the other hand, in step S405, if the exposure time Tex set is shorter than the time period which is the delay time Tds minus time Td1 (Tds−Td1), the process proceeds to step S409.

In step S409 a determination is made as to whether or not the exposure time Tex set is longer than the time period which is the delay time Tds minus time Td2 (Tds−Td2). If the exposure time Tex is longer or equal to the time period, the process proceeds to step S410, and the control process that has been described above with reference to FIG. 13 is performed. That is the control process in which after the start of the shutter (rear screen), reset scanning starts after the rear diaphragm slit forming edge 10a reaches the photo reflector 51 and before the rear diaphragm slit forming edge 10a reaches the photo reflector 52.

In step S410, a release signal for the shutter (rear screen) is generated and power supply to the rear screen control magnet is shut off to cause the shutter (rear screen) to run. Substantially simultaneously, the time (t0) at which the release signal for the shutter (rear screen) is generated is stored in step S411.

In step S412, the time (td1) at which the rear diaphragm slit forming edge 10a passes the photo reflector 51 is detected and stored. In step S413, accurate time from the start point (t0) until the time (td1) at which the rear diaphragm slit forming edge 10a passes the photo reflector 51 is calculated based on the time of start of the shutter (rear screen) 1 milliseconds after the time of generation of the release signal for the shutter (rear screen) and the time of passage of the rear screen over the photo reflector 51.

In step S414, a comparison is made between an equation of motion (polynomial) of the parallel link system constituting the rear shutter screen that has been stored in advance and the passage time between two points obtained from the known shutter (rear screen) start position and the position of the photo reflector 51. Then, the equation of motion of the parallel link system constituting the rear shutter screen is corrected based on the result of the comparison, and a running characteristic curve of the shutter (rear screen) in which the delay time Ts is taken into account is estimated. By the above process, it is possible to detect differences between the equation of motion corresponding to a specific shutter running characteristic and the actual operation of the parallel link system and to perform a feedback control to eliminate the differences.

In step S415, reset scanning of the image pickup element 106 starts in accordance with the estimated running characteristic curve of the shutter (rear screen) after the elapse of the delay time Ts after passage of the shutter over the photo reflector 51.

In step S416, the time (td2) at which the rear diaphragm slit forming edge 10a passes the photo reflector 52 is detected and stored. In step S417, a determination is made as to whether or not it is needed to correct the reset scanning of the image pickup element that has already been being performed based on the running characteristic curve estimated in step S414 and the result of comparison of the time of passing the photo reflector 52. Specifically, the estimated time of passing the photo reflector 52 derived from the equation of motion (polynomial) of the parallel link system corrected in step S414 and the actual time of passing the photo reflector 52 are compared, and correction is made if the result is larger than a predetermined value. If the correction is needed, the process proceeds to step S418, in which reset scanning to which a correction is made in such a way as to eliminate differences between the equation of motion of the parallel link system corrected in step S414 and the time of passing the photo reflector 52 is performed from halfway.

If the exposure time Tex set is shorter than the time period which is the delay time Tds minus time Td2 (Tds−Td2), the process proceeds to step S419, and the control process as shown in FIG. 12 is effected. In this control, the reset scanning starts after the rear diaphragm slit forming edge 10a reaches the photo reflector 52 after the start of the shutter (rear screen).

In step S419, a release signal for the shutter (rear screen) is first generated and the power supply to the rear screen control magnet is shut off to cause the shutter (rear screen) to run.

In step S420, the time (td1) at which the rear diaphragm slit forming edge 10a passes the photo reflector 51 is detected and stored. In step S421, the time (td2) at which the rear diaphragm slit forming edge 10a passes the photo reflector 52 is detected and stored.

In step S422 the accurate time from the time of passing the photo reflector 51 to the time of passing the photo reflector 52 is calculated based on the time (td1) of passing the photo reflector 51 and the time (td2) of passing the photo reflector 52.

In step S423, a comparison is made between an equation of motion (polynomial) of the parallel link system constituting the rear shutter screen that has been stored in advance and the passage time between the two points obtained in step S422. Then, the equation of motion of the parallel link system constituting the rear shutter screen is corrected based on the result of the comparison, and a running characteristic curve of the shutter (rear screen) in which the delay time Ts is taken into account is estimated.

In step S424, reset scanning of the image pickup element 106 starts along the estimated running characteristic curve of the shutter (rear screen) after the elapse of the delay time Ts after passage of the shutter over the photo reflector 52.

In connection with the above, in step S422, the running characteristic curve of shutter (rear screen) may be estimated taking into account information at the time of starting the shutter (rear screen) determined as the time 1 millisecond after the generation of the release signal for the shutter (rear screen).

Next, the image pickup process in the digital color camera having the above-described structure will be described with reference to FIGS. 15 to 18.

Figure 15:
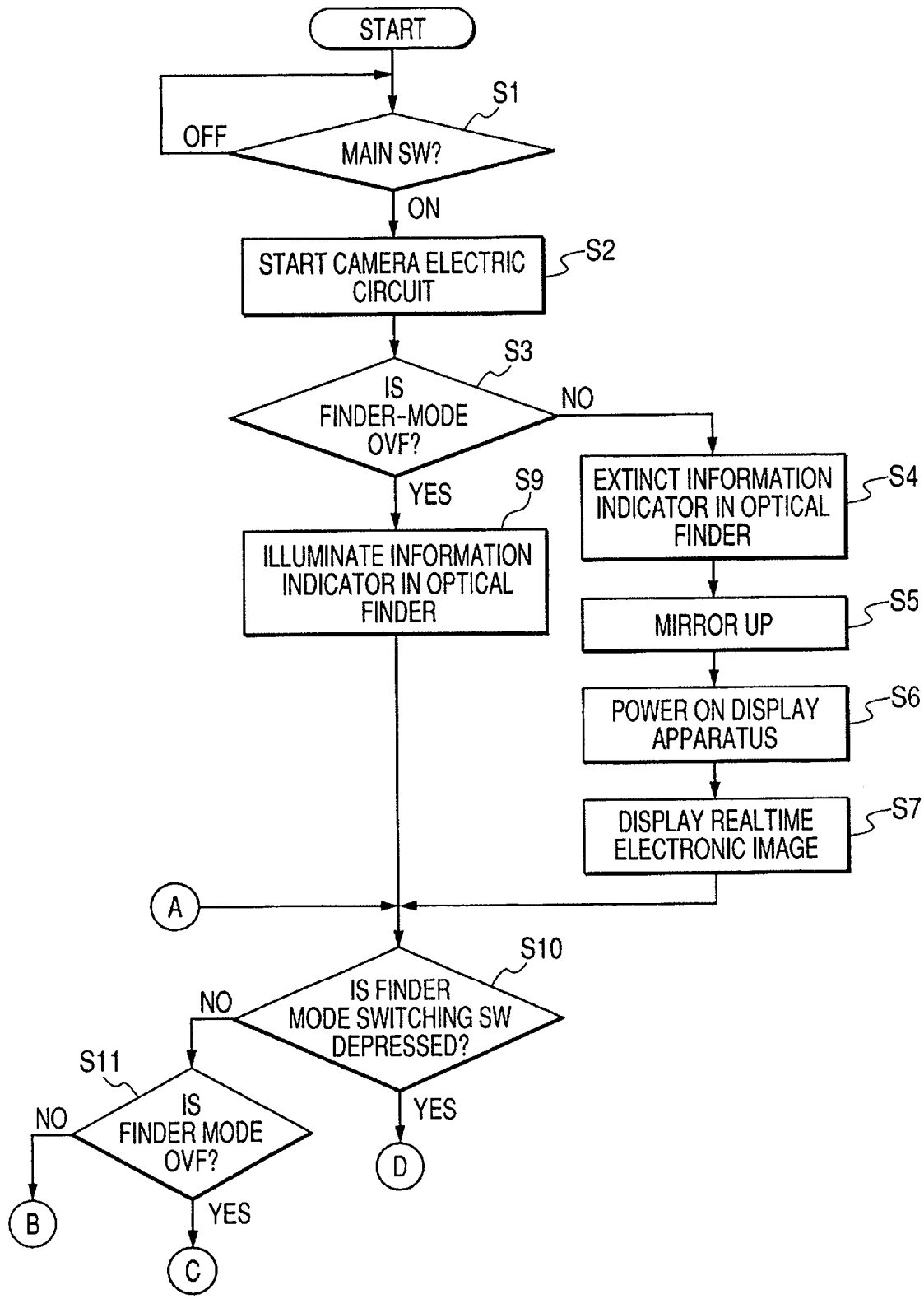
FIG. 15 is a flow chart of an image pickup process of the image pickup apparatus according to the present invention.

Firstly in step S1 shown in FIG. 15, the status of the main switch 119 is monitored. If switching to ON is detected, the electric circuit of the camera starts in step S2. In step S3, the viewfinder mode set is detected. Here, it is assumed that the OVF function is selected as the initial state. If the mode set is not the mode for effecting the OVF function (which will be referred to as the "OVF mode"), the process proceeds to step S4, and a series of processes for switching the mode to one for allowing observation of the object to be photographed on the display apparatus 107 mounted on the back face of the camera main body 101 (which mode will be referred to as the "monitor mode") are effected.

In the OVF mode, the optical path splitting system composed of the half mirror 111 and the sub mirror 122 is in the first state shown in FIG. 1.

In the monitor mode, since light from the object is not guided to the optical viewfinder, display on the in-optical-viewfinder information display apparatus 180 that is not necessary is firstly turned off in step S4. By doing so, power consumption and battery drain can be reduced.

In step S5, mirror-up is effected to retract the half mirror 111 and the sub mirror 122 to the upper portion of the mirror box to shift to the second state shown in FIG. 2.

In step S6, power of the display apparatus 107 is turned on. In the next step S7, images of the object are consecutively picked up by the image pickup element 106, and real time electronic image display on the display apparatus 107 starts, and then the process proceeds to step S10.

On the other hand, if it is determined in step S3 that the mode selected is the OVF mode, in step S9, information in the viewfinder displayed by the in-optical-viewfinder display apparatus 180 is turned on without effecting finder switching operation, and then the process proceeds to step S10.

Figure 16:
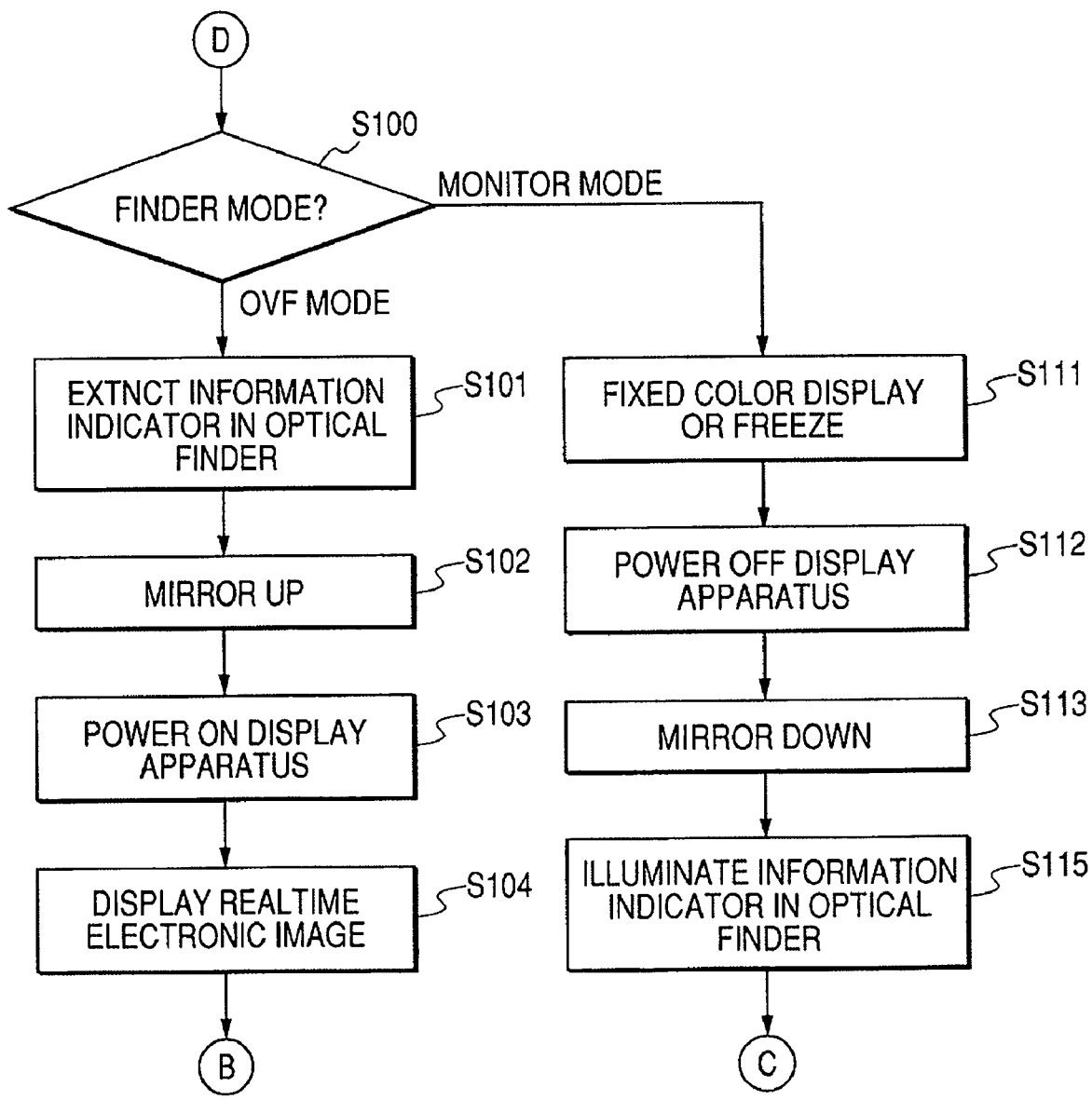
FIG. 16 is a flow chart of a finder mode switching process of the image pickup apparatus according to the present invention.

In step S10, it is checked whether or not depression of the viewfinder mode changing switch 123 is detected by the operation detection circuit 136. If depression of the viewfinder mode changing switch 123 is detected, the process of changing the viewfinder mode shown in FIG. 16 is executed.

Figure 17:
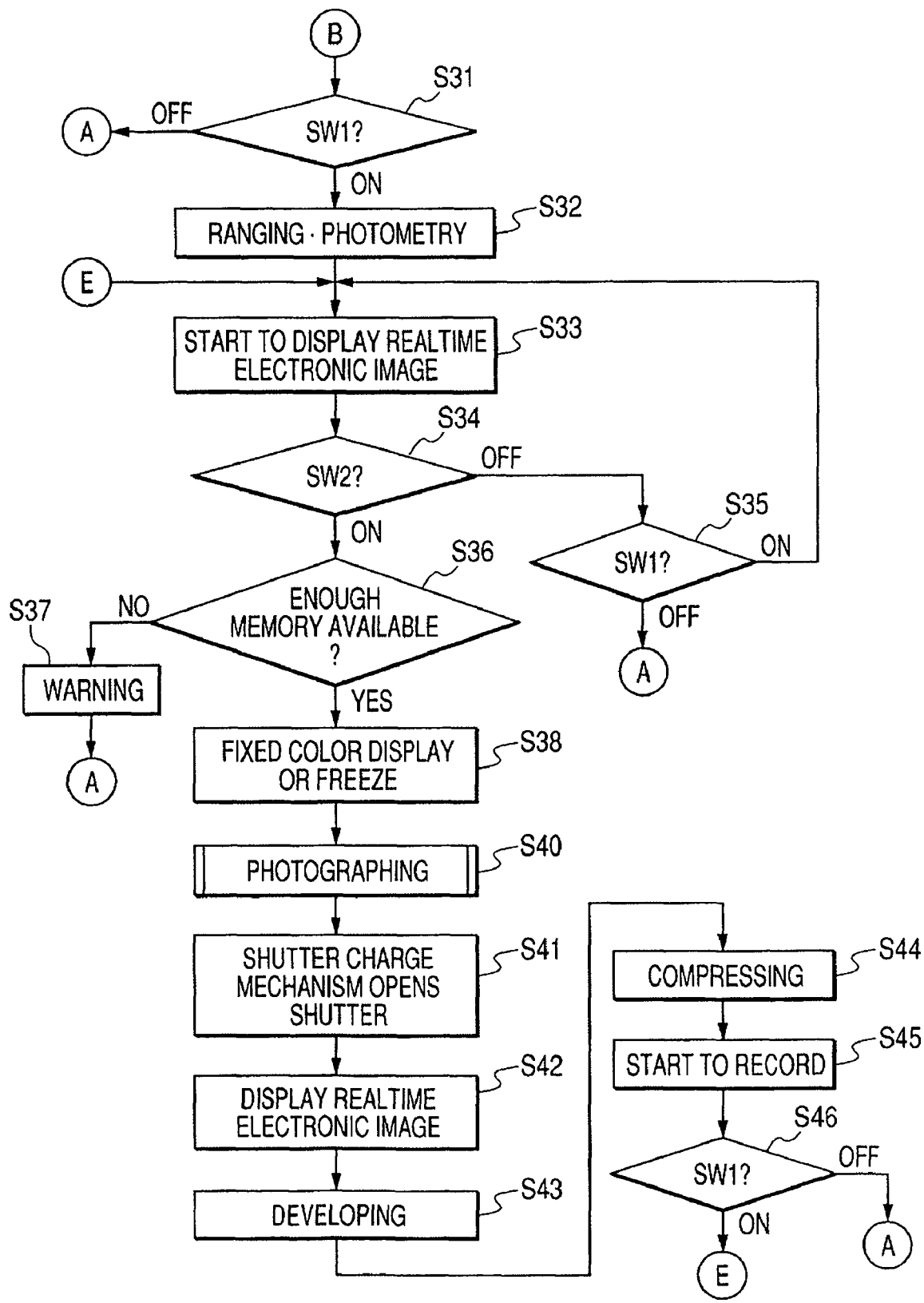
FIG. 17 is a flow chart of a photographing operation in the electronic viewfinder mode according to the present invention.
Figure 18:
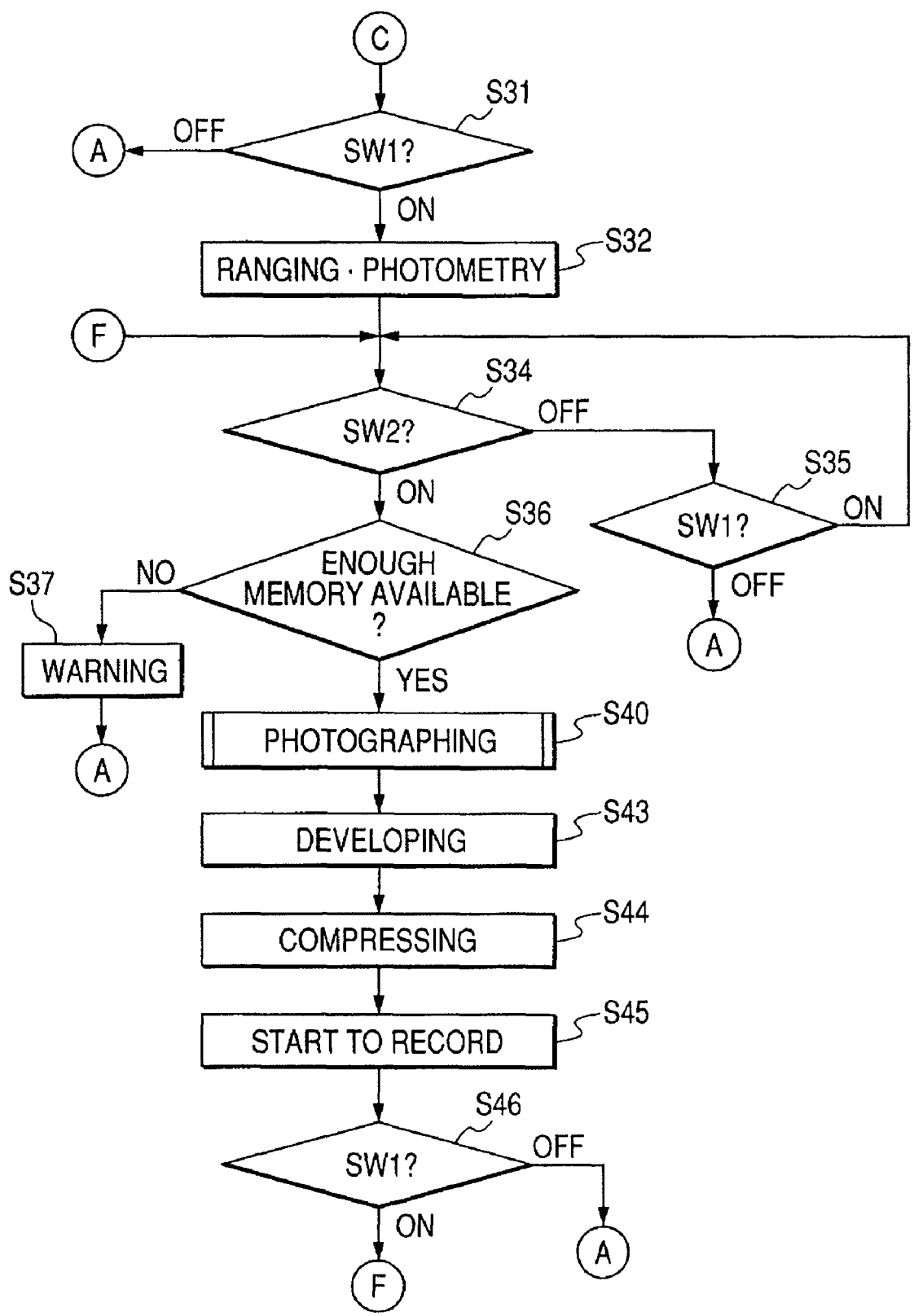
FIG. 18 is a flow chart of a photographing operation in the optical viewfinder mode according to the present invention.

If the depression of the viewfinder mode changing switch 123 is not detected, the process proceeds to step S11, where the viewfinder mode set is detected. If the viewfinder mode set is not the OVF mode, a photographing process in the monitor mode shown in FIG. 17 is executed. If the viewfinder mode set is the OVF mode, a photographing process in the OVF mode shown in FIG. 18 is executed.

Next, the viewfinder mode switching process will be described with reference to FIG. 16.

While the electric circuit of the camera is operating, status of the various operation switches are monitored by the operation detection circuit 136. When depression of the viewfinder mode changing switch 123 is detected, the viewfinder switching operation immediately starts.

In step S100, the current view finder mode is detected, and in cases where the current viewfinder mode is the OVF mode, the process proceeds to step S101 to switch the mode from the OVF mode to the monitor mode. In cases where the current mode is the monitor mode, the process proceeds to step S111 to switch the mode from the monitor mode to the OVF mode.

The mode change from the OVF mode to the monitor mode will be firstly described. In the OVF mode, the half mirror 111 of the optical path splitting system composed of the half mirror 111 and the sub mirror 122 is in the first state shown in FIG. 1. In the monitor mode, since light form the object is not guided to the optical viewfinder, unnecessary display by in-viewfinder-information display apparatus 180 is firstly turned off in step S101. By doing so, power consumption or battery consumption can be reduced.

In step S102, the half mirror 111 and the sub mirror 122 are retracted to the upper portion of the mirror box, to achieve the second state shown in FIG. 2. Then in step S103, power of the display apparatus 107 is turned on. In step S104, images of the object are consecutively picked up by the image pickup element 106, and real time electronic image display on the display apparatus 107 starts, and then the process advances to the photographing process in the monitor mode shown in FIG. 17.

On the other hand, when the mode is to be switched from the monitor mode to the OVF mode, optical path separating system composed of the half mirror 111 and the sub mirror 122 in the monitor mode before switching are in the second state shown in FIG. 2. In this state, real time electronic image display on the display apparatus 107 is in operation.

Therefore, in step S111, a fixed color image or a frozen image in which update of the real time image display is temporarily suspended is displayed on the display apparatus 107 for the moment. Alternatively, a message for informing the user of switching to the OVF mode may be displayed. The reason for performing the above operation will be described. If the half mirror 111 and the sub mirror 112 are moved while the real time electronic image display on the display apparatus 107 is still performed, great changes in light beams 103 emerging from the imaging optical system that is received by the image pickup element 106 will occur due to their movement. As a result, decent images are not displayed on the display apparatus 107, but undesirable images can be displayed. If power supply to the display apparatus 107 is turned off to prevent such a situation from occurring, there is a possibility that the photographer will misinterpret the situation as exhaustion of the battery or failure of the camera. For this reason, the process of step S111 is performed.

In step S112, power supply to the display apparatus 107 is turned off, and in addition, image pickup by the image pickup element 106 is stopped. Thus, unnecessary power consumption at that time can be prevented and the battery consumption can be reduced.

In step S113, the half mirror 111 and sub mirror 122 that are in the second state shown in FIG. 2 are moved by a biasing force of a spring in a mirror drive mechanism (not shown) to the mirror-down position or the first state shown in FIG. 1

In step S115, information in the viewfinder displayed by the in-optical-viewfinder display apparatus 180 is turned on, and the process proceeds to the photographing process in the OVF mode shown in FIG. 18.

Next, the photographing operation in the monitor mode will be described with reference to FIG. 17.

In step S31, a determination is made as to whether or not the switch SW1 has been turned on by depression of the shutter switch. If the switch SW1 is not on, the process returns to step S10 in the flow chart of FIG. 15.

If the switch SW1 is on in step S31, the process proceeds to step S32. In step S32, the camera system control circuit 135 executes a ranging process to focus the imaging optical system 103 on the object to be photographed and executes a photometry process to determine the aperture value and the shutter time. Here, the mode being the monitor mode, contrast detection ranging (i.e. TV-AF) in which high frequency components etc. of the video signal of the image pickup element 106 are detected and photometry process utilizing a signal from the image pickup element 106 are effected, and then the process proceeds to step S33. In connection with this, setting of flash is also effected in the photometry process, if necessary.

In step S33, images of the object are consecutively picked up by the image pickup element 106, and real time electronic image display on the display apparatus 107 starts. Thus, it is possible for the photographer to see the object and do framing. After that, the process proceeds to step S34.

In step S34, a determination is made as to whether switch SW2 is on or not. If the switch SW2 is off, the process returns to step S33 to continue real time electronic image display on the display apparatus 107 and repeats the above described process until the shutter switch SW1 is released (turned off) in step S35. If the shutter switch is released and the switch SW1 is turned off in step S35, the process returns to step S10 in the flow chart of FIG. 15.

If the switch SW2 is on in step S34, a determination is made by the camera system control circuit 135 in step S36 as to whether or not an image storing buffer area that can store the picked up image data is available in a memory (not shown). If an area that can store further image data is not available in the image storing buffer area in the memory, a specific warning by image display or sound is performed by the information display circuit 142 in step S37, and thereafter the process returns to step S10 in the flow chart of FIG. 15.

If it is determined in step S36 that an image storing buffer area that can store the picked up image data is available in the memory, the process proceeds to step S38, in which images of the object is consecutively picked up by the image pickup element 106. In addition, the monitor image displayed as a real time electronic image on the display apparatus 107 is changed to a fixed color display in which no object image is display or the latest object image picked up by the image pickup element 106 is displayed as a still image (frozen image). Alternatively, power supply to the display apparatus 107 may be turned off to avoid battery consumption.

In step S40, the camera system control circuit 135 effects photographing. Specifically, a photographing process in which picked up image signals accumulated for a predetermined period of time are read out from the image pickup element 106 and processed by the A/D converter 130, the RGB image processing circuit 131, the YC processing circuit 132 and the record processing circuit 133 so as to be written in a predetermined area in the memory is executed. Details of this photographing process will be described later with reference to FIG. 19.

In step S41, the rear diaphragm unit 10 to 13 of the focal plane shutter 113 to be once closed upon photographing is charged, by a shutter charge mechanism, to the photographing standby position in which the rear diaphragm unit leaves the shutter exposure apertures 1a, 40a open. Immediately after that, light from the object is continuously guided to the image pickup element 106 to allow image pickup for displaying images on the display apparatus 107.

In step S42, images of the object are consecutively picked up by the image pickup element 106 (in case power supply to the display apparatus 107 was turned off in step S38, the operation of step S42 is performed after turning on power supply to the display apparatus 107). In addition, real time electronic image display on the display apparatus 107 starts. Thus, the photographer can see the object and do framing in preparation for the next photographing.

In step S43, the camera system control circuit 135 reads out a part of the image data written in the predetermined area in the memory. In addition, white balance (WB) integration computation processing, optical black (OB) integration computation processing required for developing are effected, and the results of the computation are stored in an internal memory of the camera system control circuit 135. The camera system control circuit 135 reads out the picked up image data written in the predetermined area of the memory using the record reproduction system circuit and the image processing system 80 if needed. Various developing processes including auto white balance (AWB) processing, gamma conversion processing and color conversion processing are effected using the computation results stored in the internal memory of the camera system control circuit 135.

In addition, in the developing process, dark correction computation processing for canceling dark current noise of the image pickup element 106 etc. is also effected by subtraction using a dark image data captured by known dark capture processing.

In step S44, the record processing circuit 133 applies image compression processing on the developed image data in accordance with the mode set using compression/decompression circuit that is not shown in the drawing. Then, it writes the image data that has undergone a series of processing after photographing into a free space for images in the image storing buffer area of the memory (not shown).

In step S45, when a series of photographing operations are executed, the record processing circuit 133 reads out the image data stored in the image storing buffer area of the memory. Then, the record processing circuit 133 starts a recording process to write the data into a recording medium such as a memory card or a CompactFlash® via an interface or a connector (not shown). This recording start process is executed every time writing of image data, for which a series of processing has been completed after photographing, into a free space for images in the image storing buffer area of the memory is newly performed for that data.

In step S46, a determination is made by the camera system control circuit 135 as to whether the switch SW1 is on or not. If the switch SW1 is off, the process returns to step S10. If the switch SW1 is on, the process returns to step S33 and repeats the above-described processes until the switch SW1 is turned off.

Next, the photographing operation in the OVF mode will be described with reference to FIG. 18. In FIG. 18, the process steps same as those in FIG. 17 will be designated by the same step numbers, and descriptions thereof will be partly omitted.

In step S31, a determination is made as to whether the shutter switch has been depressed to turn the switch SW1 on or not. If the switch SW1 is not on, the process returns to step S10 in FIG. 15.

If the switch SW1 is on in step S31, the process proceeds to step S32. In step S32, the camera system control circuit 135 executes a ranging process to focus the imaging optical system 103 on the object to be photographed and executes a photometry process to determine the aperture value and the shutter time. Here, the mode being the OVF mode, ranging is effected by the focus detection apparatus 121, and the photometry process is effected using a known photometry apparatus (not shown), and thereafter the process proceeds to step S34. In connection with this, setting of flash is also effected in the photometry process, if necessary.

Subsequently, in steps S34 through S46, the processes same as those described in connection with FIG. 17 are executed. However, since the display apparatus 107 is off in the OVF mode, the processes of steps S33, S38, S41 and S42 directed to image display on the display apparatus 107 are not executed.

Figure 19:
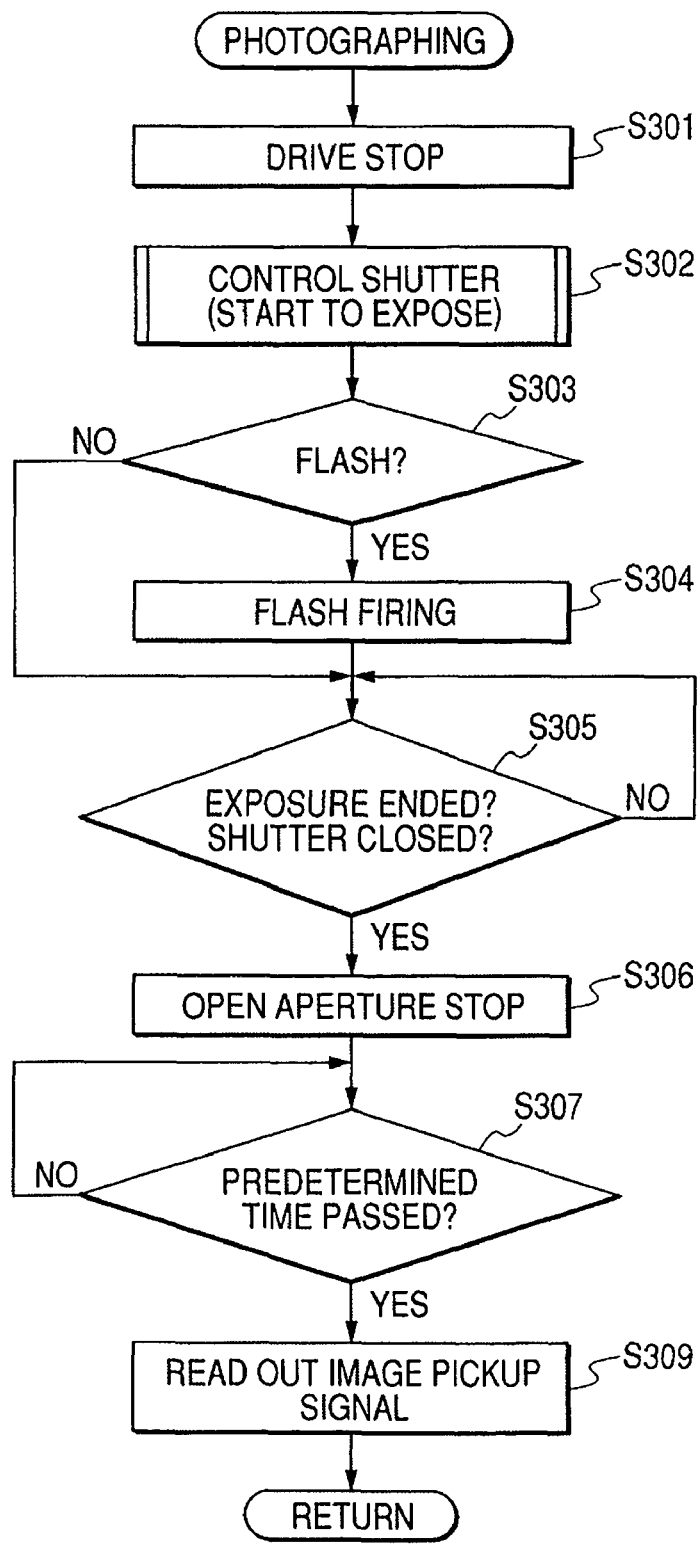
FIG. 19 is a detailed flow chart of a photographing process of the image pickup apparatus according to the present invention.

Next, the photographing process effected in step S40 in the flow charts of FIGS. 17 and 18 will be described with reference to FIG. 19.

In step S301, the camera system control circuit 135 controls the lens system control circuit 141 based on the photometry value obtained in step S32 to drive the aperture stop to a certain stop value. Then in step S302, the camera system control circuit 135 controls the shutter drive portion 81 to effect reset scanning of the image pickup element 106 and drive control of the rear screen of the shutter 113 in the manner described above with reference to FIGS. 14A and 14B to start exposure of the image pickup element 106. In the case where the exposure apertures 1a and 40a are closed by the rear diaphragm unit 10 to 13 as shown in FIGS. 5 and 9, the rear diaphragm unit 10 to 13 is returned to the position shown in FIGS. 4 and 6 prior to effecting the shutter drive process shown in FIGS. 14A and 14B.

Next, in step S303, a determination is made as to whether firing of a flash is necessary or not based on a flash flag (step S303). If firing is necessary, a flash (i.e. a flash light emitting apparatus) is fired (step S304).

The camera system control circuit 135 waits for completion of exposure of the image pickup element 106 in accordance with the photometry data, and confirm closing of the shutter 113 (step S305) to terminate exposure of the image pickup element 106.

Next, the camera system control circuit 135 drives the stop to its full aperture value using the lens system control circuit 141 (step S306).

After elapse of predetermined time (i.e. after step S307 is answered in the affirmative), charge signals are read out form the image pickup element 106 in step S309. The picked up image data is written in a certain area in the memory after processed by the A/D converter 130, the RGB image processing circuit 131, the YC processing circuit 132 and the record processing circuit 133 (step S309).

After completion of the series of processes, the photographing process is ended.

As per the above, according to the first embodiment, since it is possible to eliminate the front screen of the focal plane shutter 113 by performing reset scanning of the image pickup element 106, downsizing of the shutter can be achieved, and it is not necessary to drive the front screen. Therefore, it is possible to reduce the shutter release lag. Moreover, the running status of the focal plane shutter is detected by two photo reflectors 51 and 52 disposed in the shutter run-up zone. Thus, it is possible to reflect the result of detection of the shutter running status to reset scanning of the image pickup element 106 immediately prior to staring the exposure. Accordingly, it is possible to realize highly accurate shutter control in terms of exposure time.

Although two photo reflectors 51 and 52 are provided in the above-described first embodiment, more than two photo reflectors may be used if they can be arranged in the shutter run-up zone, needless to say.

Second Embodiment

In the following, the second embodiment of the present invention will be described.

Figure 20:
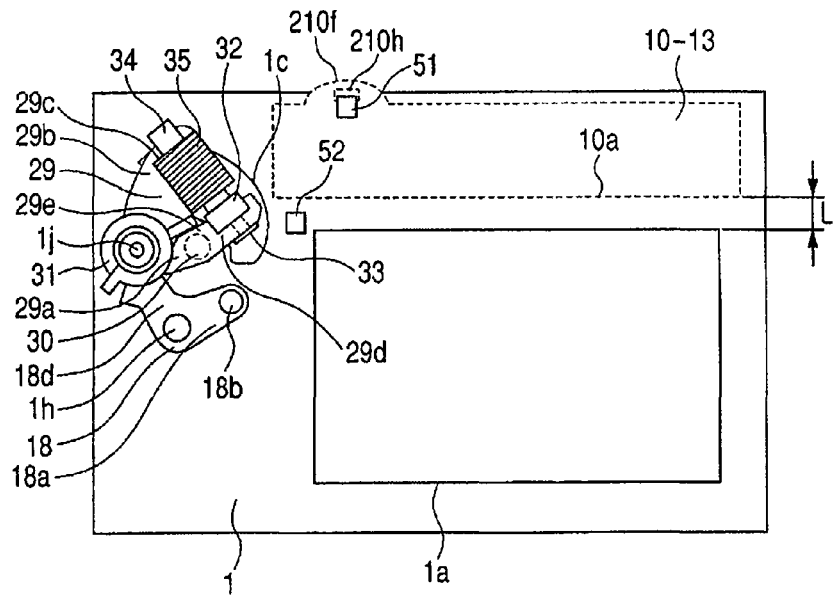
FIG. 20 is a plan view showing the structure of the focal plane shutter viewed from the photographing unit side of a shutter base plate in a state in which shutter running in a shutter run-up zone has just started, in a second embodiment of the present invention.
Figure 21:
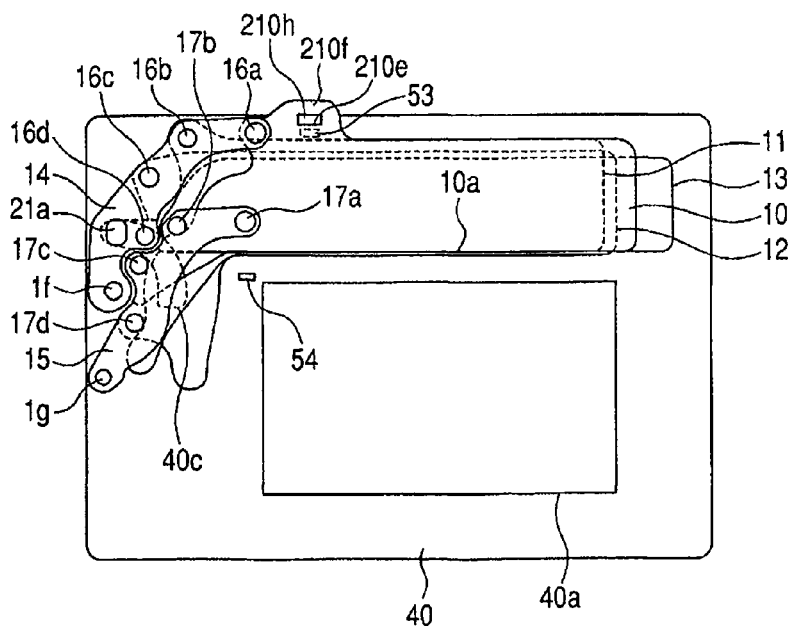
FIG. 21 is a plan view showing the state of the rear diaphragm before start of shutter running of the focal plane shutter, in the second embodiment of the present invention.

In the second embodiment, a focal plane shutter 113 having a structure different from that of the above-described first embodiment is used. FIGS. 20 to 22 show the structure of the focal plane shutter 113 in the second embodiment of the present invention.

FIG. 20 is a schematic plan view showing the structure on the photographing lens unit 102 side of the shutter base plate 1 of the focal plane shutter 113 according to the second embodiment of the present invention at the start of shutter running in the shutter run-up zone. FIGS. 21 and 22 are plan views showing, in particular, the structure of the rear diaphragm. These drawings show the structure on the rear side of the shutter base plate 1. FIG. 21 shows the state before shutter running starts, and FIG. 22 shows the state after shutter running is completed. In FIGS. 20 to 22, the elements same as those in the first embodiment shown in FIGS. 4 to 9 are designated by the same reference numerals, and descriptions thereof will be omitted. In the following, only what is different from the first embodiment will be described.

In FIG. 20, reference numeral 210f designates a projecting portion formed on the upper side of the rear diaphragm slit forming blade 10 near its base portion jointed with the first arm 14 by a swaging dowel 16a. Reference numeral 210h designate a hole to be detected formed on the projecting portion 210f. When the shutter (rear screen) running is completed, the hole to be detected 210h is within the shutter exposure apertures 1a and 40a. However, it is formed at such a position that does not cause any problem in shielding against light and in movement as shown in FIG. 22.

In FIGS. 21 and 22, reference numeral 210e designates the hole edge to be detected that is actually detected by the photo reflector 51 as the shutter (rear screen) passing point.

In the above-described first embodiment, movement of the rear diaphragm slit forming edge 10a is detected by two photo reflectors 51 and 52 that are juxtaposed closed to each other. However, there are limitations in design in arranging or mounting them in a small space. In contrast, in this second embodiment having the above-described shutter structure, the photo reflector 51 is disposed with a large upward offset, so that freedom of design is enhanced.

The relationship between the time and position at which the photo reflector 51 and the photo reflector 52 detect the shutter (rear screen) is the same as that in the first embodiment.

As per the above, according to the second embodiment, it is possible to achieve improvement in freedom of design as well as the advantageous effects same as those of the first embodiment.

Third Embodiment

In the following, the third embodiment of the present invention will be described.

Figure 24:
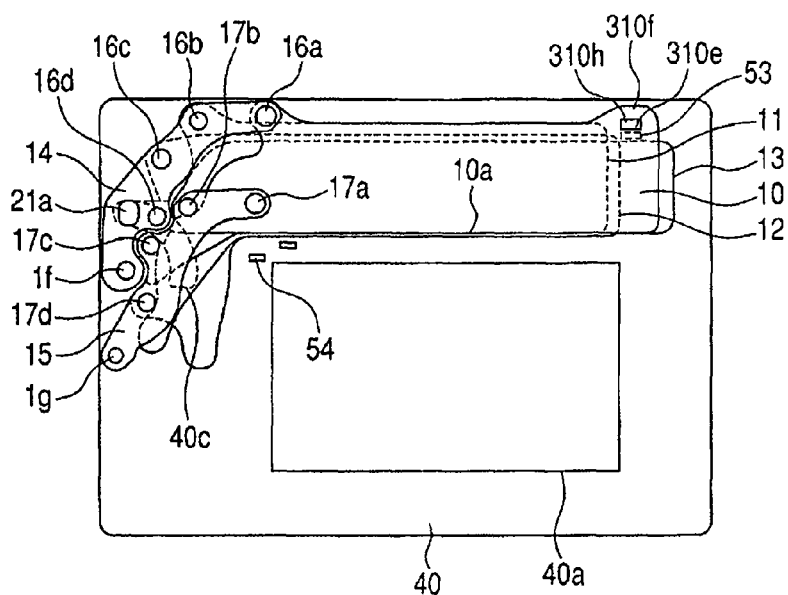
FIG. 24 is a plan view showing the state of the rear diaphragm before start of shutter running of the focal plane shutter, in the third embodiment of the present invention. A plan view showing the rear diaphragm of the image pickup apparatus according to the third embodiment of the present invention at the start of shutter running (the structure on the rear side of the shutter base plate).
Figure 25:
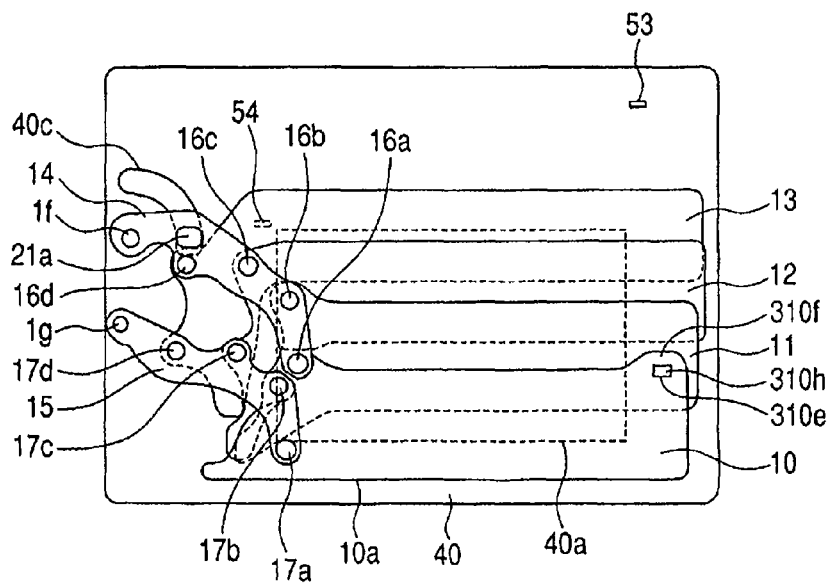
FIG. 25 is a plan view showing the state of the rear diaphragm after completion of shutter running of the focal plane shutter, in the third embodiment of the present invention.

In the third embodiment, a focal plane shutter 113 having a structure different from that of the above-described first and second embodiments is used. FIGS. 23 to 25 show the structure of the focal plane shutter 113 in the third of the present invention.

FIG. 23 is a schematic plan view showing the structure on the photographing lens unit 102 side of the shutter base plate 1 of the focal plane shutter 113 according to the third embodiment of the present invention at the start of shutter running in the shutter run-up zone. FIGS. 24 and 25 are plan views showing, in particular, the structure of the rear diaphragm. These drawings show the structure on the rear side of the shutter base plate 1. FIG. 24 shows the state before shutter running starts, and FIG. 25 shows the state after shutter running is completed. In FIGS. 23 to 25, the elements same as those in the first embodiment shown FIGS. 4 to 9 are designated by the same reference numerals, and descriptions thereof will be omitted. In the following, only what is different from the first embodiment will be described.

In FIG. 23, reference numeral 310f designates a projecting portion formed on the upper side of the tip end portion of rear diaphragm slit forming blade 10. Reference numeral 310h designate a hole to be detected formed on the projecting portion 310f. The hole to be detected is formed at a position that will not be within the shutter exposure apertures 1a and 40a in any shutter (rear screen) running status. Therefore, it does not cause any problem in shielding against light. In addition, it is formed at a position that causes no problem in movement.

In FIGS. 24 and 25, reference numeral 310e designates the hole edge to be detected that is actually detected by the photo reflector 51 as the shutter (rear screen) passing point.

In the above-described first embodiment, movement of the rear diaphragm slit forming edge 10a is detected by two photo reflectors 51 and 52 that are juxtaposed closed to each other. However, there are limitations in design in arranging or mounting them in a small space. In contrast, in this third embodiment having the above-described shutter structure, the photo reflector 51 is disposed with a large upward offset, so that freedom of design is enhanced.

The relationship between the time and position at which the photo reflector 51 and the photo reflector 52 detect the shutter (rear screen) is the same as that in the first embodiment.

As per the above, according to the third embodiment, it is possible to achieve improvement in freedom of design as well as the advantageous effects same as those of the first embodiment.

Fourth Embodiment

Next, the fourth embodiment of the present invention will be described.

FIGS. 26 and 27 are schematic plan views showing the structure on the photographing lens unit 102 side of the shutter base plate 1 of the focal plane shutter 113 according to the fourth embodiment of the present invention while the shutter is running. In FIGS. 26 to 27, the elements same as those in the first embodiment shown FIGS. 4 to 9 are designated by the same reference numerals, and descriptions thereof will be omitted. In the fourth embodiment, in addition to the photo reflectors 51 and 52, three photo reflectors 453, 454 and 455 are further provided. Each of the photo reflectors 453, 454 and 455 has a light emitting portion and a light receiving portion. The photo reflectors 453, 454 and 455 are disposed at positions beside the shutter exposure aperture 1a on the shutter drive mechanism side thereof on the shutter base plate 1.

Reflection plates are provided at positions on the cover plate 40 opposed to the photo reflectors 453 to 455 respectively, though the reflection plates are not shown in the drawings. Light beams emitted from the light emitting portions of the photo reflectors 453 to 455 are reflected by the respective reflection plates and received by the light receiving portions of the photo reflectors 453 to 455, and converted into electric signals. As described before, the rear diaphragm unit 10 to 13 has a very low reflectivity as compared to the reflection plates. Therefore, when the reflection plates are covered by the rear diaphragm unit 10 to 13, the amounts of light received by the light receiving portions are small, since the light from the light emitting portions is blocked by the rear diaphragm unit. Therefore, by detecting abrupt changes in the electric signals output from the light receiving portions, it is possible to detect passing of the rear diaphragm slit forming edge 10a over the reflection plates.

In the above-described first embodiment, two photo reflectors 51 and 52 for detecting movement of the rear diaphragm slit forming edge 10a are juxtaposed closed to each other. However, there are limitations in design in arranging or mounting them in a small space. In contrast, in this fourth embodiment, not so much limitations are placed on the three photo reflectors 453 to 455 disposed in the exposure zone as compared to the two photo reflectors 51 and 52 disposed in the run-up zone. Therefore, it is possible to arrange the photo reflectors 453 to 455 without offset in the longitudinal direction (the horizontal direction in FIGS. 26 and 27) orthogonal to the running direction of the rear diaphragm.

In the fourth embodiment, photo reflector 453 is disposed near the exposure start position, and photo reflector 454 is disposed at a position in the first half of the shutter running length over the shutter exposure aperture 1a. By arranging them in this way, detection results can be fed back to reset scanning of the image pickup element functioning as the front shutter screen as early as possible, and corrective control is made possible for medium shutter speeds like 1/500 second and 1/250 second. Photo reflector 455 is disposed at a position in the second half of the shutter running length over the shutter exposure aperture 1a so as to make it possible to correct at least the fastest exposure time from the shutter exposure aperture end. All of the photo reflectors are provided at positions at which they can detect the rear diaphragm slit forming edge 10a of the shutter. By arranging the photo reflectors in the above-described manner, the fastest exposure time for which the highest degree of precision is required can be stably controlled with high accuracy. However, the photo reflectors may be arranged in other ways than that described above, needless to say.

Figure 28:
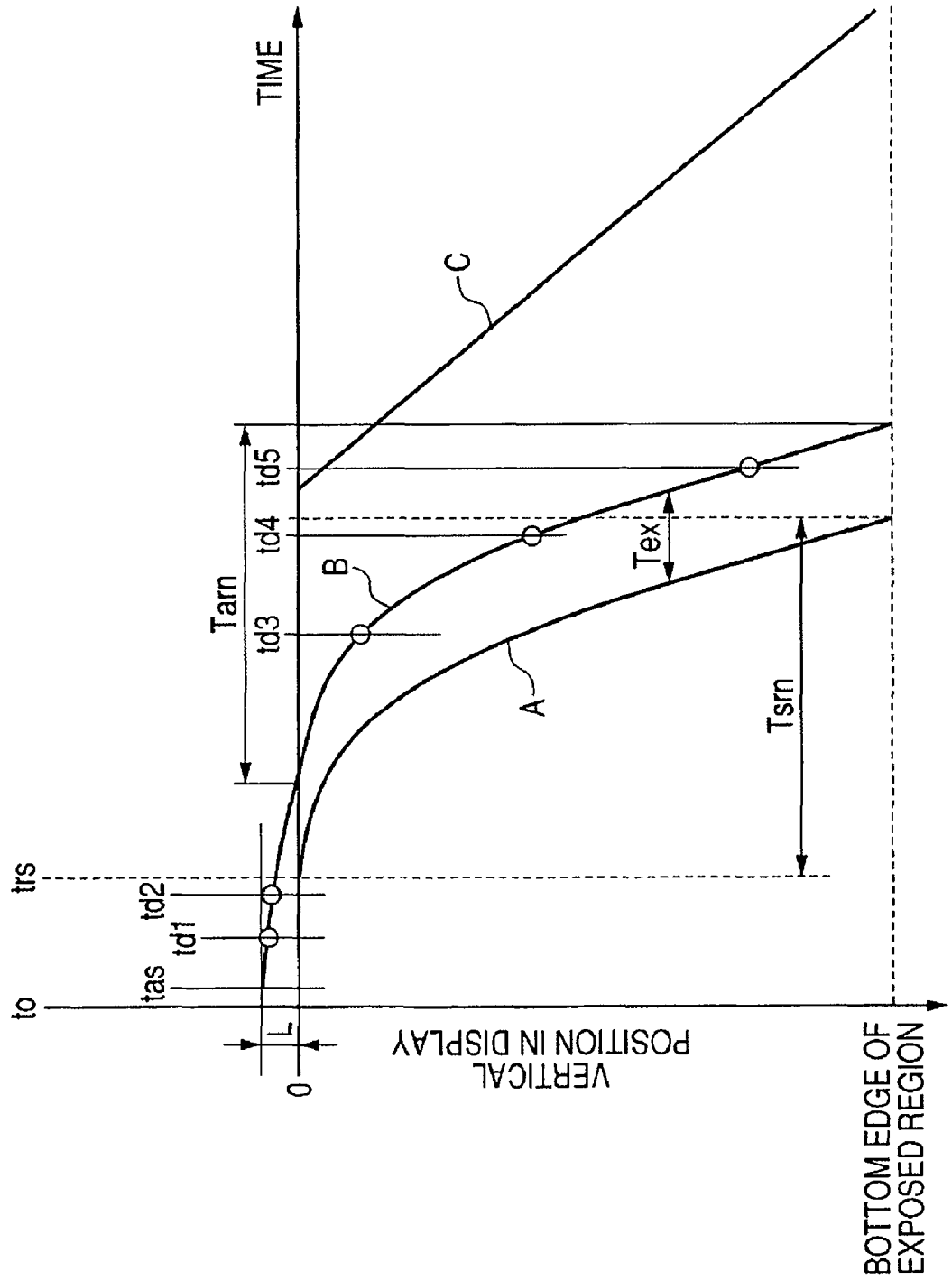
FIG. 28 is a graph showing relationship of the reset scanning position, the position of the rear diaphragm slit forming edge and the pixel signal read-out position of the image pickup element against time for the run-up zone in the image pickup apparatus according to the fourth embodiment of the present invention.
Figure 29B:
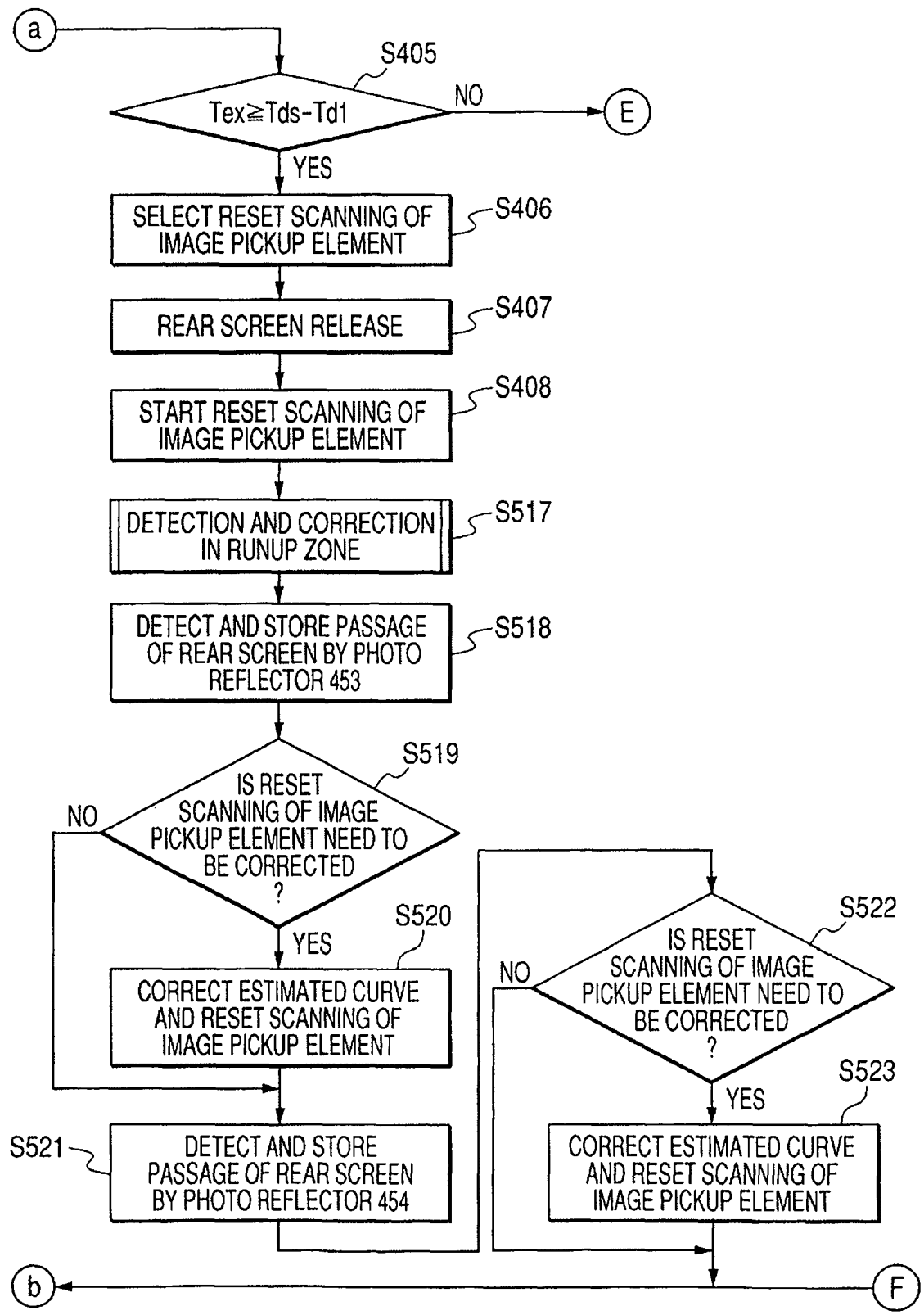
FIG. 29 is composed of FIGS. 29A and 29B showing a flow chart of a shutter control process in the fourth embodiment of the present invention.
Figure 30B:
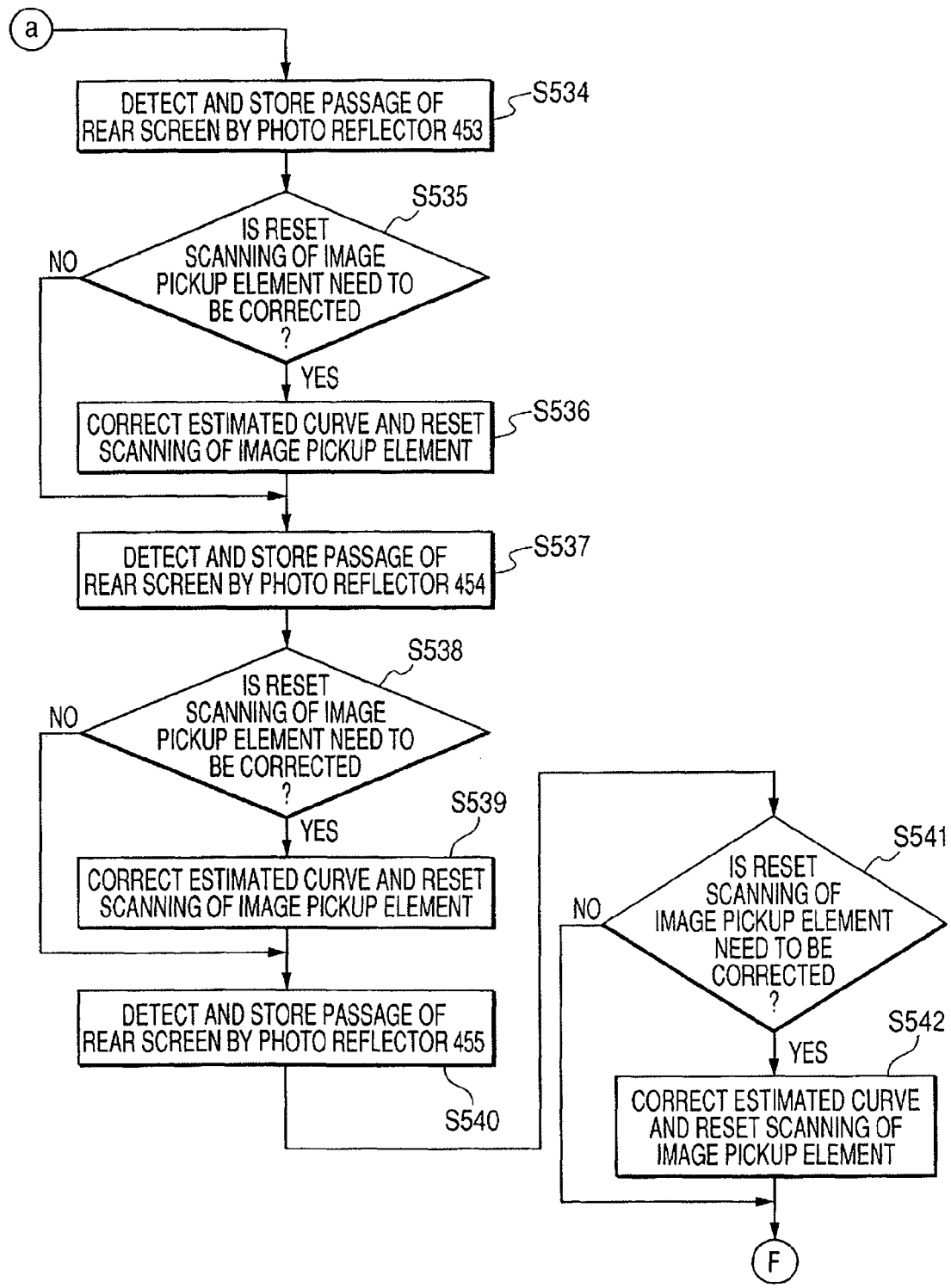
FIG. 30 is composed of FIGS. 30A and 30B showing a flow chart of a shutter control process in the fourth embodiment of the present invention.

FIG. 28 is a graph for illustrating shutter control in still picture photographing with the focal plane shutter 113 having the structure shown in FIGS. 26 and 27. In FIG. 28, the vertical axis represents position along the vertical direction on the image pickup surface of the image pickup element 106 and the horizontal axis represents time. FIG. 28 differs from FIG. 11 in that time td3, td4 and td5 at which the shutter (rear screen) is detected by the photo reflectors 453, 454 and 455 are added, but the other portions are the same as FIG. 11. Therefore, detailed description thereof will be omitted.

FIGS. 29A, 29B, 30A and 30B are flow charts of a shutter control process in the fourth embodiment. In FIGS. 29A, 29B, 30A and 30B, the process steps same as those in the first embodiment that have been described with reference to FIGS. 14A and 14B will be designated with the same step numbers, and descriptions thereof will be omitted if appropriate. What is different in this process from that of FIGS. 14A and 14B is that the running status of the shutter (rear screen) is determined based on the passing time td3, td4 and td5 of the rear diaphragm slit forming edge 10a detected by the additional photo reflectors 453 to 455 and that reset scanning is correctively controlled in accordance with the determination.

Firstly in step S401 in the flow chart of FIG. 29A, after shutter 113 control process starts, the exposure time Tex and the delay time Tds from generation of a release signal for the shutter (rear screen) to arrival of the rear diaphragm slit forming edge 10a to the shutter exposure aperture 1a are compared in terms of which is longer. In an instance in the case where a focal plane shutter that can achieve typical high shutter speeds is used, the delay time Tds is 3 ms. If the exposure time Tex is longer than or equal to the delay time Tds, the process proceeds to step S502.

In step S502, a determination is made as to whether or not the exposure time Tex set is longer than the time Tarn (1/250 second) took by shutter (rear screen) running. Namely, a determination is made as to the exposure time is longer than the time Tarn (1/250 second) from the time at which the shutter (rear screen) reaches the shutter exposure aperture 1a until the completion of shielding of the shutter exposure aperture 1a. If the exposure time Tex is longer than or equal to time Tarn, the process proceeds to step S402.

Subsequently, the processes of steps S402 to 404 are executed in the same manner as described above with reference to FIGS. 14A and 14B. In cases where Tex≧Tarn, at the time when the shutter (rear screen) running starts, reset scanning of the image pickup element functioning as the front shutter screen has been already completed for all over the image pickup area. Accordingly, even if running of the shutter (rear screen) is detected and a running characteristic curve is estimated, it is not possible to feed it back to the image pickup element functioning as the front shutter screen. In addition, the exposure times longer than 1/250 second are so long that even if there is a little difference between the actual running characteristic of the shutter (rear screen) and the reset scanning of the image pickup element, contribution of the difference on the exposure error is small. Therefore, the reset scanning of the image pickup element may be effected in conformity with a specific shutter running characteristic stored in advance. Although a determination is made in step S502 as to whether Tex≧Tarn is satisfied or not, it is preferable that the criterion be set shorter than time Tarn, since the last photo reflector 455 detects the shutter (rear screen) before the bottom edge of the shutter exposure aperture 1a.

On the other hand, if time Tarn is larger than time Tex in step S502, the process proceeds to step S506.

In step S506, reset scanning is effected in conformity with the specific shutter running characteristic stored in advance. In step S507, the process stands by for a time period equal to the exposure time Tex minus the delay time Tds.

In step S508, a shutter release signal for the shutter (rear screen) is generated. In step S509, detection of the shutter (rear screen) in the run-up zone is effected, and the result is fed back to reset scanning of the image pickup element 106 functioning as the front shutter screen.

Figure 31:
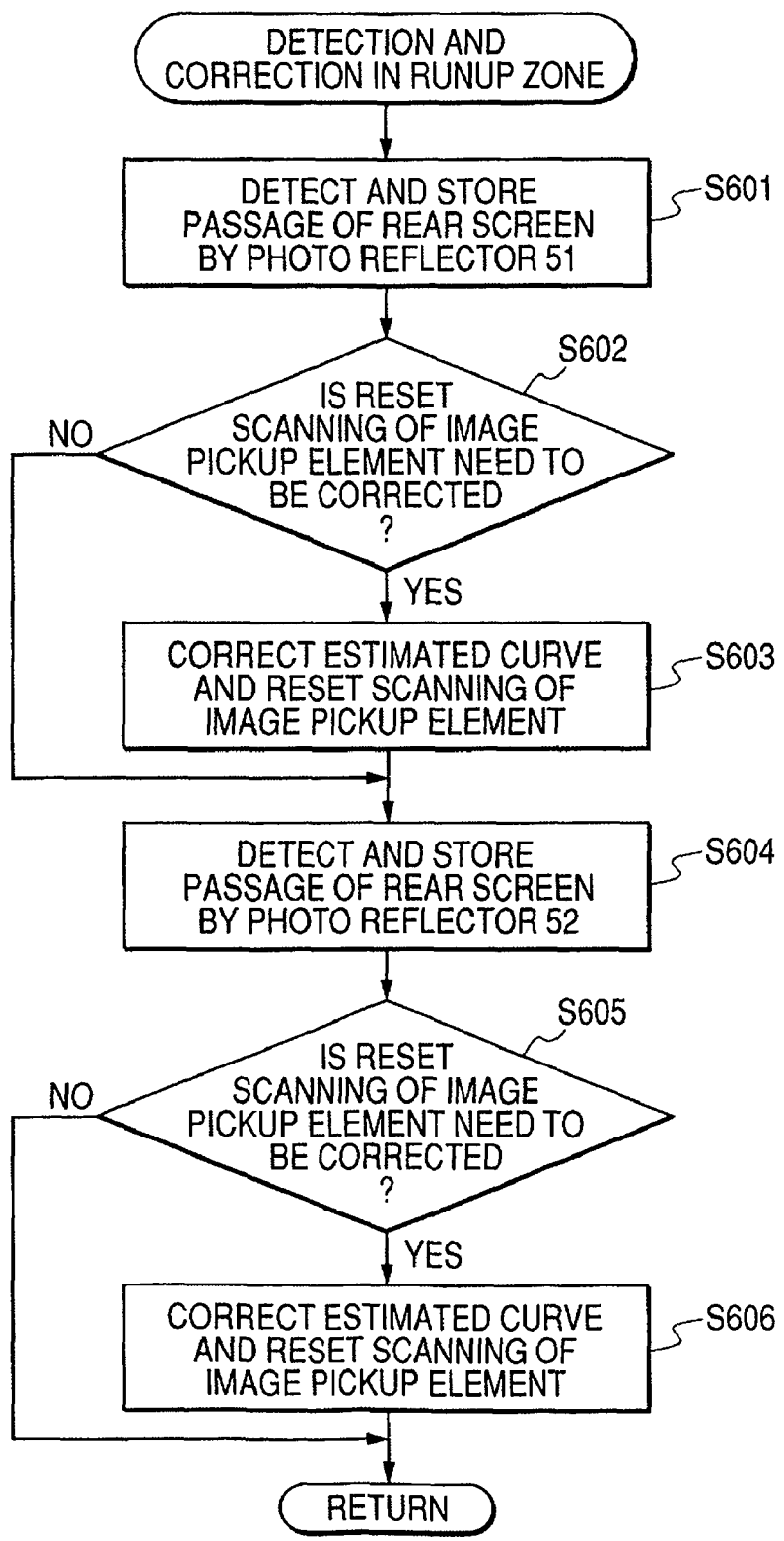
FIG. 31 is a flow chart of a shutter control process in the fourth embodiment of the present invention.

Here, the process of step S509 will be described with reference to a flow chart shown in FIG. 31.

In step S601, the time (td1) at which the rear diaphragm slit forming edge 10a passes the photo reflector 51 is detected and stored. In step S602, a determination is made as to whether or not it is needed to correct the reset scanning of the image pickup element 106 that has already been being performed based on the time of passing the photo reflector 51. Specifically, the estimated time of passing the photo reflector 51 derived from an equation of motion (polynomial) of the parallel link system stored in advance and the actual time of passing the photo reflector 51 are compared, and correction is made if their difference is larger than a predetermined value. If the correction is needed, the process proceeds to step S603, and if the correction is not needed, the process proceeds to step S604. In step S603, reset scanning to which a correction is made in such a way as to eliminate difference between the equation of motion of the parallel link system stored in advance and the time of passing the photo reflector 51 is performed from halfway.

In step S604, the time (td2) at which the rear diaphragm slit forming edge 10a passes the photo reflector 52 is detected and stored. In step S605, a determination is made as to whether or not it is needed to correct the reset scanning of the image pickup element 106 that has already been being performed based on the time of passing the photo reflector 52. Specifically, the estimated time of passing the photo reflector 52 derived from the current equation of motion (polynomial) of the parallel link system and the actual time of passing the photo reflector 52 are compared, and correction is made if their difference is larger than a predetermined value. If the correction is needed, the process proceeds to step S606. In step S606, reset scanning to which a correction is made in such a way as to eliminate difference between the current equation of motion of the parallel link system and the time of passing the photo reflector 51 is performed from halfway. Here, in the case where a correction has been made to the equation of motion of the parallel link system corresponding to the specific running characteristic curve stored in advance, the current equation of motion of the parallel link system refers to the equation of motion of the parallel link system to which the latest correction has been applied. In the case where a correction has not been made to the equation of motion of the parallel link system, the current equation of motion of the parallel link system refers to the equation of motion of the parallel link system corresponding to the specific running characteristic curve stored in advance. After step S606 and in the case where the correction is not needed, the process proceeds to step S510 in the flow chart of FIG. 29A.

In step S510, the time (td3) at which the rear diaphragm slit forming edge 10a passes the photo reflector 453 provided in the exposure zone is detected and stored. In step S511, a determination is made as to whether or not it is needed to correct the reset scanning of the image pickup element 106 that has already been being performed based on the time of passing the photo reflector 453, in a similar manner as in step S605. If the correction is needed, the process proceeds to step S512, in which reset scanning to which a correction is made in such a way as to eliminate difference between the current equation of motion of the parallel link system and the time of passing the photo reflector 453 is performed from halfway.

At the time (Td4) the rear diaphragm slit forming edge 10a passes the photo reflector 454, the reset scanning of image pickup element 106 functioning as the front shutter screen has already been completed. Therefore, results of detection by the photo reflector 454 and the subsequent photo reflector cannot be fed back to the reset scanning of the image pickup element 106.

Referring back to step S401, if the delay time Tds is the larger, the process proceeds to step S405. In step S405, if the exposure time Tex set is larger than or equal to the delay time Tds minus time Td1, the processes of steps S406 to S408 same as those in the flow chart of FIG. 14A are performed. After the process of step S408, the process proceeds to step S517. In step S517, detection of the shutter (rear screen) in the run-up zone is effected as shown in FIG. 31 in a similar manner as in step S509, and the result is fed back to reset scanning of the image pickup element 106 functioning as the front shutter screen.

In step S518, the time (Td3) at which the rear diaphragm slit forming edge 10a passes the photo reflector 453 provided in the exposure zone is detected and stored. In step S519, a determination is made as to whether or not it is needed to correct the reset scanning of the image pickup element 106 that has already been being performed based on the time of passing the photo reflector 453, in a similar manner as in step S605. If the correction is needed, the process proceeds to step S520, in which reset scanning to which a correction is made in such a way as to eliminate difference between the current equation of motion of the parallel link system and the time of passing the photo reflector 453 is performed from halfway. After that, the process proceeds to step S521. On the other hand, if the correction is not needed, the process directly proceeds to step S521.

In step S521, the time (Td4) at which the rear diaphragm slit forming edge 10a passes the photo reflector 454 present in the exposure zone is detected and stored. In step S522, a determination is made as to whether or not it is needed to correct the reset scanning of the image pickup element 106 that has already been being performed based on the time of passing the photo reflector 454, in a similar manner as in step S605. If the correction is needed, the process proceeds to step S523, in which reset scanning to which a correction is made in such a way as to eliminate difference between the current equation of motion of the parallel link system and the time of passing the photo reflector 454 is performed from halfway.

At the time (Td5) the rear diaphragm slit forming edge 10a passes the photo reflector 455, the reset scanning of image pickup element 106 functioning as the front shutter screen has already been completed. Therefore, the result of detection by the photo reflector 455 cannot be fed back to the reset scanning of the image pickup element 106.

If it is determined in step S405 that the exposure time Tex set is shorter than the delay time Tds minus time Td1, the process proceeds to step S409 in FIG. 30A. If it is determined in step S409 that the exposure time Tex is longer than or equal to the delay time Tds minus time Td2, the processes of steps S410 to S418 are executed in the same way as those of the flow chart of FIG. 14B, and thereafter the process proceeds to step S534. On the other hand, if it is determined in step S409 that the exposure time Tex is shorter than the delay time Tds minus time Td2, the process proceeds to step S419, and the processes of steps S419 to S424 are executed in the same way as those of the flow chart of FIG. 14B, and thereafter the process proceeds to step S534.

In step S534, the time (Td3) at which the rear diaphragm slit forming edge 10a passes the photo reflector 453 present in the exposure zone is detected and stored. In step S535, a determination is made as to whether or not it is needed to correct the reset scanning of the image pickup element 106 that has already been being performed based on the time of passing the photo reflector 453, in a similar manner as in step S605. If the correction is needed, the process proceeds to step S536, in which reset scanning to which a correction is made in such a way as to eliminate difference between the current equation of motion of the parallel link system and the time of passing the photo reflector 453 is performed from halfway. After that, the process proceeds to step S537. On the other hand, if the correction is not needed, the process directly proceeds to step S537.

In step S537, the time (Td4) at which the rear diaphragm slit forming edge 10a passes the photo reflector 454 present in the exposure zone is detected and stored. In step S538, a determination is made as to whether or not it is needed to correct the reset scanning of the image pickup element 106 that has already been being performed based on the time of passing the photo reflector 454, in a similar manner as in step S605. If the correction is needed, the process proceeds to step S539, in which reset scanning to which a correction is made in such a way as to eliminate difference between the current equation of motion of the parallel link system and the time of passing the photo reflector 454 is performed from halfway. After that, the process proceeds to step S540. On the other hand, if the correction is not needed, the process directly proceeds to step S540.

In step S540, the time (Td5) at which the rear diaphragm slit forming edge 10a passes the photo reflector 455 present in the exposure zone is detected and stored. In step S541, a determination is made as to whether or not it is needed to correct the reset scanning of the image pickup element 106 that has already been being performed based on the time of passing the photo reflector 455, in a similar manner as in step S605. If the correction is needed, the process proceeds to step S542, in which reset scanning to which a correction is made in such a way as to eliminate difference between the current equation of motion of the parallel link system and the time of passing the photo reflector 455 is performed from halfway.

The above-described shutter control process is executed in step S302 of the flow chart of FIG. 19 described in connection with the first embodiment in place of the process shown in FIGS. 14A and 14B.

As per the above, according to the fourth embodiment, shutter control with high accuracy is made possible in addition to advantageous effects of the above-described first embodiment.

Although in the fourth embodiment three photo reflectors 453 to 455 are provided in addition to the photo reflectors 51 and 52, the number of the additional photo reflectors is not limited to three. The number of the additional photo reflectors may be one or more.

Other Modes

Although in the embodiments, means for detecting running of the rear diaphragm is illustrated as a photo reflector, the detection means is not limited to a photo reflector. Various detection means such a photo interrupter, one in which light emitted from a light emission system is received by a line sensor or an area sensor, or one in which a magnetism is locally given to the diaphragm slit forming edge so that it is detected by a magnetic sensor such as a semiconductor MR element may be used.

In addition, what is detected may be movement of arms 14, 15 to which the rear diaphragm slit forming blade 10 and the rear diaphragm cover blades 11 to 13 are linked or movement of the rear diaphragm drive member 29 coupled to the arms.

It is obvious that the object of the present invention is achieved also by providing a system or an apparatus with a storage medium (or a recording medium) in which software program codes for realizing the functions of the above-described embodiments are recorded and reading and executing the program codes stored in the storage medium by a computer (or CPU, MPU). In such cases, the program codes read out from the storage medium themselves realize the functions of the above-described embodiments, and the storage medium in which the program codes are stored constitutes the present invention. The present invention also includes the case where the functions of the above-described embodiments are realized by execution of the program codes on a computer that reads out the program codes. It is obvious that the present invention also includes the case where part or all of the actual processing is executed by an operating system (OS) or the like running on a computer based on instructions of the program codes to realize the functions of the above-described embodiments by that process. The recording medium in which the program codes are stored may be, for example, a flexible disk, a hard disk, a ROM, a RAM, a non-volatile memory card, a CD-ROM, a CD-R, a DVD, an optical disk and a magnetooptical disk. Computer networks such as a local area network (LAN) and a wide area network (WAN) may be used to supply the program codes.

Needless to say, the present invention also includes the case where the program codes read out from the storage medium are written in the memory of a function expansion unit connected to a computer or a function expansion card inserted in a computer, and part or all of the actual processing is executed by the CPU of the function expansion unit or the function expansion card based on instructions of the program codes to realize the functions of the above-described embodiments.

When the present invention is applied to the above-described storage medium, it stores program codes corresponding to the flow charts shown in FIGS. 14A, 14B or 29A, 29B through 31 described before.

The present invention is not limited to the above embodiments and various changes and modifications can be made within the spirit and scope of the present invention. Therefore, to apprise the public of the scope of the present invention, the following claims are made.

This application claims priorities from Japanese Patent Application Nos. 2004-328056 filed on Nov. 11, 2004, and 2005-310502 filed on Oct. 25, 2005, which are hereby incorporated by reference herein.

What is claimed is:

1. An image pickup apparatus comprising:
   an image pickup element that converts an optical object image incident thereon into an electric image signal to output it;
   a shutter apparatus having a screen for shielding an exposure aperture for the image pickup element;
   a reset circuit for reset scanning the image pickup element on a predetermined unit-batch-by-unit-batch basis sequentially in a running direction of the screen;

a plurality of detection portions disposed at different positions in the running direction of the screen for detecting passing of the screen after start of running of the screen for shielding the exposure aperture and before beginning of blocking of light from entering the exposure aperture, wherein the plurality of detection portions are disposed at positions where the plurality of detection portions do not face the screen before the screen starts running for shielding the exposure aperture; and a control circuit that estimates a running characteristic of the screen during running based on a detection result by the plurality of detection portions and controls reset scanning by the reset circuit in conformity with the estimated running characteristic.

2. An image pickup apparatus according to claim 1, wherein said detection portions are disposed in an area between said screen before starting running and said exposure aperture.

3. An image pickup apparatus according to claim 1, wherein when the distance between said screen before starting running and said exposure aperture is represented by L, coordinate Y is set in the running direction of said screen, and an origin of the coordinate Y is set at upper edge of the exposure aperture, at least one of said detection portions is disposed at a position satisfying Y.

4. An image pickup apparatus according to claim 1, wherein said shutter apparatus comprises a focal plane shutter, and said predetermined unit batch comprises one dimensional pixel row extending orthogonal to the running direction of the focal plane shutter.

5. An image pickup apparatus comprising:
an image pickup element that converts an optical object image incident thereon into an electric image signal to output it;
a shutter apparatus having a screen for shielding an exposure aperture for the image pickup element;
a reset circuit for reset scanning the image pickup element on a predetermined unit-batch-by-unit-batch basis sequentially in a running direction of the screen;
at least one detection portion for detecting passing of the screen after start of running of the screen for shielding the exposure aperture and before beginning of blocking of light from entering the exposure aperture, wherein the at least one detection portion is disposed at positions where the at least one detection portion does not face the screen before the screen starts running for shielding the exposure aperture; and
a control circuit that estimates a running characteristic of the screen during running based on time at which a command for starting running of the screen is received and a detection result by the detection portion and controls reset scanning by the reset circuit in conformity with the estimated running characteristic.

6. An image pickup apparatus according to claim 5, wherein said detection portion is disposed in an area between said screen before starting running and said exposure aperture.

7. An image pickup apparatus according to claim 5, wherein said shutter apparatus comprises a focal plane shutter, and said predetermined unit batch comprises one dimensional pixel row extending orthogonal to the running direction of the focal plane shutter.

8. A control method for an image pickup apparatus having an image pickup element that converts an optical object image incident thereon into an electric image signal to output it, a shutter apparatus having a screen for shielding an exposure apparatus for the image pickup element and a plurality of detection portion disposed at different positions along the running direction of the screen for detecting passing of the screen after start of running of the screen for shielding the exposure aperture and before beginning of blocking of light from entering the exposure aperture, wherein the plurality of detection circuits are disposed at positions where the plurality of detection portion do not face the screen before the screen starts running for shielding the exposure aperture, the method comprising:
a reset step of starting reset scanning for resetting the image pickup element on a predetermined unit-batch-by-unit-batch basis sequentially in a running direction of the screen before starting shielding of the exposure aperture by the screen;
a screen running step of starting running of the screen;
a detection step of detecting passing of the screen by the plurality of detection portions;
an estimation step of estimating a running characteristic of the screen during running based on a detection result by the plurality of detection portions; and
a control step of controlling the reset scanning in conformity with the estimated running characteristic.

9. A non-transitory computer-readable medium that stores a program that can be executed by an information processing apparatus, comprising a program code for implementing the method according to claim 8.

10. A control method for an image pickup apparatus having an image pickup element that converts an optical object incident thereon into an electric image signal to output it, a shutter apparatus having a screen for shielding an exposure aperture for the image pickup element and at least one detection portion for detecting passing of the screen after start of running of the screen for shielding the exposure aperture and before beginning of blocking of light from entering the exposure aperture, wherein the at least one detection portion is disposed at positions where the at least one detection portion does not face the screen before the screen starts running for shielding the exposure aperture, the method comprising:
a reset step of starting reset scanning for resetting the image pickup element on a predetermined unit-batch-by-unit-batch basis sequentially in a running direction of the screen before starting shielding of the exposure aperture by the screen;
a screen running step of starting running of the screen;
a detection step of detecting passing of the screen by the at least one detection portion;
an estimate step of estimating a running characteristic of the screen during running based on time at which a command for starting running of the screen is received and a detection result by the detection portion; and
a control step of controlling the reset scanning in conformity with the estimated running characteristic.

11. A non-transitory computer-readable medium that stores a program that can be executed by an information processing apparatus, comprising a program code for implementing the method according to claim 10.

12. An image pickup apparatus comprising:
an image pickup element that converts an optical object image incident thereon into an electric image signal to output it;
a shutter apparatus having a screen for shielding an exposure aperture for the image pickup element;
a reset circuit for reset scanning the image pickup element sequentially in a running direction of the screen;
a plurality of detection portions disposed at different positions in the running direction of the screen for detecting passing of the screen, wherein the plurality of detection portions are disposed at positions where the plurality of detection portions do not face the screen at an initial position before the screen starts running, and are disposed, in the running direction of the screen, on an exposure-aperture side of the initial position and on an initial-position side of the exposure aperture; and a control circuit that estimates a running characteristic of the screen during running based on a detection result by the plurality of detection portions and controls reset scanning by the reset circuit in conformity with the estimated running characteristic.

13. An image pickup apparatus comprising:
an image pickup element that converts an optical object image incident thereon into an electric image signal to output it;
a shutter apparatus having a screen for shielding an exposure aperture for the image pickup element;
a reset circuit for reset scanning the image pickup element sequentially in a running direction of the screen;
at least one detection portion for detecting passing of the screen, wherein the at least one detection portion is disposed at positions where the at least one detection portion does not face the screen at an initial position before the screen starts running, and is disposed, in the running direction of the screen, on an exposure-aperture side of the initial position and on an initial-position side of the exposure aperture; and
a control circuit that estimates a running characteristic of the screen during running based on time at which a command for starting running of the screen is received and a detection result by the detection portion and controls reset scanning by the reset circuit in conformity with the estimated running characteristic.

14. A control method for an image pickup apparatus having an image pickup element that converts an optical object image incident thereon into an electric image signal to output it, a shutter apparatus having a screen for shielding an exposure apparatus for the image pickup element and a plurality of detection portions disposed at different positions along the running direction of the screen for detecting passing of the screen, wherein the plurality of detection portions are disposed at positions where the plurality of detection portions do not face the screen at an initial position before the screen starts running, and are disposed, in the running direction of the screen, on an exposure-aperture side of the initial position and on an initial-position side of the exposure aperture, the method comprising:

a reset step of starting reset scanning for resetting the image pickup element sequentially in a running direction of the screen before starting shielding of the exposure aperture by the screen;
a screen running step of starting running of the screen;
a detection step of detecting passing of the screen by the plurality of detection portions;
an estimation step of estimating a running characteristic of the screen during running based on a detection result by the plurality of detection portions; and
a control step of controlling the reset scanning in conformity with the estimated running characteristic.

15. A control method for an image pickup apparatus having an image pickup element that converts an optical object incident thereon into an electric image signal to output it, a shutter apparatus having a screen for shielding an exposure aperture for the image pickup element and at least one detection portion for detecting passing of the screen, wherein the at least one detection portion is disposed at positions where the plurality of detection portions do not face the screen at an initial position before the screen starts running, and are on a side of the exposure aperture than at the initial position and on a side of the initial position than at the exposure aperture in the running direction of the screen, the method comprising:

a reset step of starting reset scanning for resetting the image pickup element sequentially in a running direction of the screen before starting shielding of the exposure aperture by the screen;
a screen running step of starting running of the screen;
a detection step of detecting passing of the screen by the at least one detection portion;
an estimate step of estimating a running characteristic of the screen during running based on time at which a command for starting running of the screen is received and a detection result by the detection portion; and
a control step of controlling the reset scanning in conformity with the estimated running characteristic.

16. A non-transitory computer-readable medium that stores a program that can be executed by an information processing apparatus, comprising a program code for implementing the method according to claim 14.

17. A non-transitory computer-readable medium that stores a program that can be executed by an information processing apparatus, comprising a program code for implementing the method according to claim 15.

* * * * *